(12) United States Patent
Smith et al.

(10) Patent No.: US 7,665,564 B2
(45) Date of Patent: Feb. 23, 2010

(54) POWER TRAIN FOR A UTILITY VEHICLE

(75) Inventors: Steven David Smith, Evans, GA (US); Joseph George Land, III, Evans, GA (US); John Thomas Bobbitt, III, Evans, GA (US); Byron Jon Danielson, Martinez, GA (US)

(73) Assignee: Club Car, Inc., Evans, GA (US)

( * ) Notice: Subject to any disclaimer, the term of this patent is extended or adjusted under 35 U.S.C. 154(b) by 0 days.

(21) Appl. No.: 12/154,735

(22) Filed: May 27, 2008

(65) Prior Publication Data
US 2008/0230294 A1 Sep. 25, 2008

Related U.S. Application Data

(62) Division of application No. 10/983,496, filed on Nov. 8, 2004, now Pat. No. 7,377,351.

(60) Provisional application No. 60/518,539, filed on Nov. 7, 2003.

(51) Int. Cl.
*B60K 17/34* (2006.01)
*B60K 17/354* (2006.01)

(52) U.S. Cl. .................. 180/233; 180/245; 180/248

(58) Field of Classification Search ............... 180/245, 180/233, 248; 475/330
See application file for complete search history.

(56) References Cited

U.S. PATENT DOCUMENTS

| | | | |
|---|---|---|---|
| 3,108,481 A | 10/1963 | Westmont | |
| 3,331,464 A | 7/1967 | Van Doorne | |
| 3,613,816 A | 10/1971 | Gutbrod | |
| 3,796,275 A | 3/1974 | Bouyer | |
| 4,063,609 A | 12/1977 | Kincaid | |
| 4,809,796 A | 3/1989 | Yamaoka et al. | |
| 5,289,730 A | 3/1994 | Wilson et al. | |
| 6,425,452 B1 | 7/2002 | Steiner et al. | |
| 6,488,110 B2 | 12/2002 | Price | |
| 6,935,476 B2 * | 8/2005 | Kurmaniak | 192/35 |
| 2005/0173177 A1 * | 8/2005 | Smith et al. | 180/233 |
| 2007/0017309 A1 * | 1/2007 | Hasegawa et al. | 74/331 |

* cited by examiner

*Primary Examiner*—Lesley Morris
*Assistant Examiner*—Marc A Scharich
(74) *Attorney, Agent, or Firm*—Michael Best & Friedrich LLP

(57) ABSTRACT

A power train for a vehicle includes a gearbox with an input shaft and an output shaft and is configured such that the input shaft drives the output shaft at a single speed ratio in a first direction and a single speed ratio in a second direction. The output shaft is coupleable with the front and rear vehicle axles to separately drive each axle. Further, a continuously variable transmission is connected with an engine shaft and with the gearbox input shaft such that the engine shaft drives the input shaft within a range of speed ratios from less than 1 to greater than 3. Front and rear differentials are coupled with each axle and with the output shaft and drive the axles at different speed ratios such that a base surface drives the front axle independently of the front differential when at least one rear wheel rolls upon the surface.

11 Claims, 16 Drawing Sheets

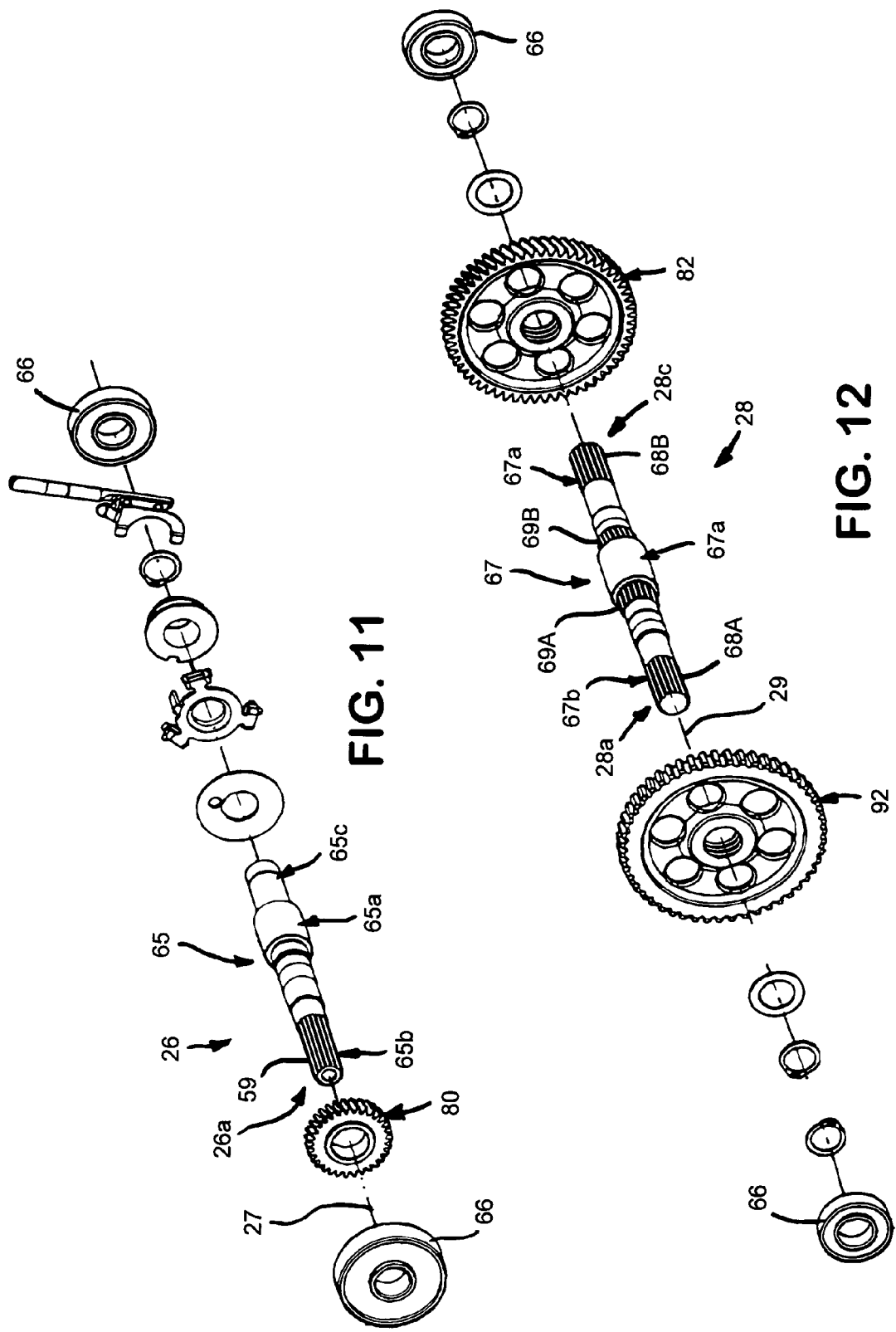

POWER TRAIN FOR A UTILITY VEHICLE

This application is a divisional of U.S. application Ser. No. 10/983,496, filed Nov. 8, 2004, now U.S. Pat. No. 7,377,351, which claims priority to U.S. Provisional Application Ser. No. 60/518,539, filed Nov. 7, 2003, the entire contents of which are incorporated herein by reference.

BACKGROUND OF THE INVENTION

The present invention relates to vehicles such as utility vehicles, golf cars and NEVS, and more particularly to power trains for such vehicles.

Vehicles such as utility vehicles, golf cars, NEVs, etc., typically include a frame, front and rear axles connected with the frame, two wheels connected with each axle and an engine or a motor mounted on the frame and configured to rotatably drive at least one axle. When the "prime mover" is an engine, such vehicles generally include a power train for transferring engine power from an output shaft of the engine to the driven axle or axles. As an engine output shaft generally rotates at a much higher speed than the desired rotational speed of the driven axle(s), power trains typically include a transmission that functions to drive the axles at a significantly lesser speed than the speed of engine output shaft. Often, power trains include one or two rotatable propeller shafts that function to transfer torque and rotational motion from the transmission to the one or more driven axles.

SUMMARY OF THE INVENTION

In one aspect, the present invention is a power train for a vehicle having a frame, an engine mounted to the frame and having a rotatable output shaft, and front and rear axles each rotatably connected with the frame. The power train basically comprises a gearbox including a rotatable input shaft and a rotatable output shaft operably coupleable with the input shaft. The gear box is configured such that the input shaft drives the output shaft at a single, fixed speed ratio in a first rotational direction and alternatively drives the output shaft at a single, fixed speed ratio in a second, opposing rotational direction. The output shaft is operatively coupleable with the front axle and with the rear axle so as to separately drive each one of the two axles to rotate with respect to the frame. Further, a continuously variable transmission unit is connected with the engine shaft and with the gearbox input shaft such that the engine shaft drives the input shaft. The transmission unit is configured so that a ratio of the engine shaft rotational speed to the input shaft rotational speed is variable within a range of values having a lower limit of less than 1 and an upper limit of greater than 3.

In another aspect, the present invention is also a power train for a vehicle having a frame, an engine mounted to the frame and having a rotatable output shaft, and front and rear axles each rotatably connected with the frame. Each axle includes two axle shafts and two wheels, each wheel being connected with a separate one of the axle shafts and rollable upon a base surface. The power train comprises a transmission operably connected with the engine and having an output shaft. A first propeller shaft has a first end, the first end being connected with the transmission output shaft, and a second end. A front differential is connected with each one of the two front axle shafts and has a gear member configured to rotatably drive the two front shafts. The front differential is operatively connected with the second end of the first propeller shaft such that the first propeller shaft drives the gear member at a first speed reduction ratio. Further, a second propeller shaft has a first end, the first end being connected with the transmission output shaft, and a second end. A rear differential is connected with each one of the two rear axle shafts and having a gear member configured to rotatably drive the two rear shafts. The rear differential is operatively connected with the second end of the second propeller shaft such that the second propeller shaft drives the rear differential gear member at a second speed reduction ratio. The first speed ratio is greater than the second speed ratio such that the base surface drives the two front axle shafts to rotate independently of the front differential gear member when at least one of the two rear wheels rolls upon the base surface. Furthermore, the rear differential is configured to releasably connect each one of the two rear axle shafts with the other one of the two rear axle shafts when each of the two rear wheels rolls at about the same speed as the other one of the two rear wheels such that the two rear axle shafts rotate generally as a single unit. The rear differential is also configured to alternatively disconnect at least one of the two rear axle shafts from the other one of the two rear axle shafts when one of the two rear wheels rolls at a greater speed than the other one of the two rear wheels during a turning movement of the vehicle.

In a further aspect, the present invention is a transmission for a vehicle that includes a frame, an engine connected with the frame and having an output shaft rotatable about a central axis, front and rear axles rotatably connected with the frame, and two propeller shafts each connected with a separate one of the two axles. The transmission comprises an input shaft rotatable about a central axis extending through the input shaft. The input shaft is operably coupleable with the engine shaft such that the engine shaft drives the input shaft to rotate about the input shaft central axis, the input shaft axis extending generally parallel with respect to the engine shaft axis. Further, an output shaft is rotatable about a central axis extending through the output shaft and is connected with each one of the two propeller shafts. The output shaft is operably coupleable with the input shaft such that the input shaft drives the output shaft to rotate about the output shaft central axis, the output shaft axis extending generally parallel with respect to the input shaft axis.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 11 is an exploded view of an input shaft of the gearbox;

FIG. 12 is an exploded view of an output shaft of the gearbox;

FIG. 16, are two radial cross-sectional views through line 16-16 of FIG. 15, each showing a different relative position of a carrier and a side member;

DETAILED DESCRIPTION OF THE INVENTION

Figure 1:
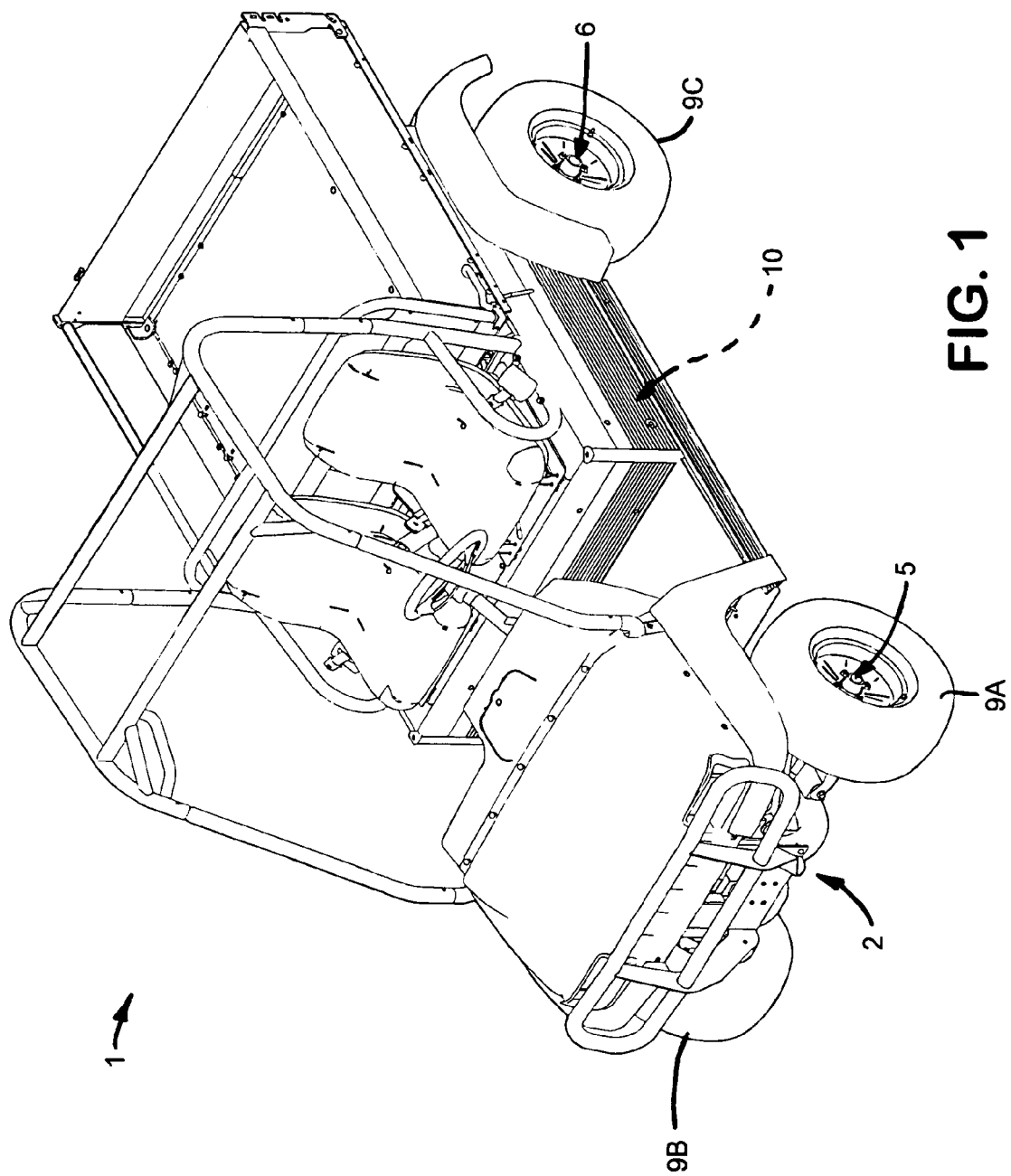
FIG. 1 is a perspective view of a utility vehicle incorporating a power train in accordance with the present invention.

Certain terminology is used in the following description for convenience only and is not limiting. The words "right", left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words or similar import.

Referring now to the drawings in detail, wherein like numbers are used to indicate like elements throughout, there is shown in FIGS. 1-21 a power train 10 for a utility vehicle 1. The vehicle 1 preferably includes a frame 2 with a centerline 2a, an engine 3 with a rotatable output shaft 4, and front and rear axles 5 and 6 rotatably connected with the frame 2, with each axle 5, 6 preferably including two axle shafts 7A, 7B and 8A, 8B, respectively, and two wheels 9A, 9B and 9C, 9D each connected with a separate one of the axle shafts 7A, 7B, 8A, 8B, respectively, and rollable upon a base or ground surface G. The power train 10 basically comprises a transmission 12 operably connected with the engine 3 and having an output shaft 13, first and second propeller shafts 14, 16, respectively, each operably connected with transmission output shaft 13, a front differential 18 connected with the first propeller shaft 14 and operatively connected with the front axle 5, and a rear differential 20 connected with the second propeller shaft 16 and operatively connected with the rear axle 6. The transmission 12 preferably comprises two main components; a continuously variable transmission unit 22 (a "CVT" or "CV" transmission) and a gearbox or "transfer case" 24 operably connected with the transmission unit 22. The gearbox 24 includes an input shaft 26 rotatable about a central axis 27 and an output shaft 28 rotatable about a central axis 29 and operably coupleable with the input shaft 26, the gearbox output shaft 28 providing the transmission output shaft 13.

Preferably, the gear box 24 is configured such that the input shaft 26 rotatably drives the output shaft 28 at a single, fixed speed ratio in a first rotational direction $d_{R1}$ and alternatively drives the output shaft 28 at a single, fixed speed ratio in a second, opposing rotational direction $d_{R2}$, as described below. Further, the CV transmission unit 22 is connected with the engine output shaft 4 and with the gearbox input shaft 26 such that the engine output shaft 4 rotatably drives the input shaft 26 through the CV transmission unit 22. The transmission unit 22 is preferably configured so that a ratio $R_T$ of the engine shaft rotational speed $S_E$ to the input shaft rotational speed $S_I$ (i.e., $R_T = S_E/S_I$) is variable within a range of values having a lower limit of less than 1 and an upper limit of greater than 3. Most preferably, the speed ratio lower limit is about 0.6 and the speed ratio upper limit is about 3.6. As such, the gearbox output shaft 28 is rotatable at a highest speed setting when the transmission unit speed ratio is about 0.6 and rotatable at a lowest speed setting when the transmission unit speed ratio is about 3.6, the highest speed setting being greater than the lowest speed setting by about a factor of 6. Further, the transmission 12 is preferably configured such that the input shaft axis 27 extends generally parallel with respect to the engine shaft axis 4a and the output shaft axis 29 extends generally parallel with respect to the input shaft axis 27, with each axis 4a, 27 and 29 preferably extending generally parallel with respect to the frame centerline 2a, for reasons discussed below.

The first propeller shaft 14 preferably has a first end 14a connected with the gearbox output shaft 28, a second end 14b and a central axis 15 extending between the two ends 14a, 14b. The front differential 18 is connected with each one of the two front axle shafts 7A, 7B and has a gear member 30 (e.g., FIG. 14) configured to rotatably drive the two front axle shafts 7A, 7B to rotate about a front axle axis 31. Further, the front differential 18 is operatively connected with the second end 14b of the first propeller shaft 14 such that the first propeller shaft 14 drives the gear member 30 at a first speed reduction ratio $R_1$. In addition, the second propeller shaft 16 preferably has a first end 16a, the first end 16a being connected with the gearbox output shaft 28, a second end 16b and a central axis 17 extending between the two ends 16a, 16b. The rear differential 20 is connected with each one of the two rear axle shafts 8A, 8B and has a gear member 32 (e.g., FIG. 17) configured to rotatably drive the two rear axle shafts 8A, 8B to rotate about a rear axle axis 33. Further, the rear differential 20 is operatively connected with the second end 16b of the second propeller shaft 16 such that the second propeller shaft 16 drives the gear member 32 at a second speed reduction ratio $R_2$.

Each propeller shaft 14, 16 is driven by the output shaft 28 such that each propeller shaft 14, 16 rotates about the respective shaft axis 15, 17 at about the same rotational speed as the other propeller shaft 16, 14. However, the first speed ratio $R_1$ is greater than the second speed ratio $R_2$ such that the front differential 18 rotatably drives the front axle shafts 7A, 7B at a speed $S_F$ that is lesser or "slower" than the speed $S_R$ at which the rear differential drives the rear axle shafts 8A, 8B. As such, the rear wheels 9C, 9D drive the vehicle 1 and cause the base surface G to drive the front wheels 9A, 9B to roll at about the same speed as the rear wheels 9C, 9D. As such, the two front axle shafts 7A, 7B connected to the front wheels 9A, 9B rotate at speed greater than the rotational speed of the front differential gear member 30, such that no torque is transferred from the first propeller shaft 14 to the front axle shafts 7A, 7B. Thus, the base surface G drives the two front axle shafts 7A, 7B to rotate at a greater speed than the front differential gear member 30 when at least one of the two rear wheels 9C, 9D rolls upon the base surface G. When both rear wheels 9C, 9D slip such that the front wheels 9A, 9B begin to slow down (i.e., rotate at a lesser speed), the front differential 18 is configured to operatively couple the gear member 30 with the two front axle shaft 7A, 7B such that the first propeller shaft 14 rotatably drives the axle shafts 7A, 7B, as discussed in greater detail below.

Preferably, the front differential 18 and the rear differential 20 are each configured to releasably connect the two associated axle shafts 7A, 7B or 8A, 8B, respectively, when the vehicle 1 is traveling generally in a straight line and to disconnect at least one of the axle shafts 7A, 7B or 8A, 8B from the associated shaft 7B, 7A or 8B, 8A when the vehicle 1 performs a turning or steering movement. More specifically, the front differential 18 is configured to releasably connect each one of the two front axle shafts 7A, 7B with the other one of the two front axle shafts 7B, 7A when each of the two front wheels 9A, 9B rolls at about the same speed as the other one of the two front wheels 9B, 9A, such that the two front axle shafts 7A, 7B rotate generally as a single unit (i.e., rotate as a connected-together assembly). The front differential 18 is further configured to alternatively disconnect at least one of the two front axle shafts 7A, 7B from the other one of the two front axle shafts 7B, 7A when one of the two front wheels 9A, 9B rolls at a greater speed than the other one of the two front wheels 9B, 9A during a turning movement of the vehicle 1. Further, the rear differential 20 is configured to releasably connect each one of the two rear axle shafts 8A, 8B with the other one of the two rear axle shafts 8B, 8A when each of the two rear wheels 9C, 9D rolls at about the same speed as the other one of the two rear wheels 9D, 9C such that the two rear axle shafts 8A, 8B rotate generally as a single unit. The rear differential 20 is further configured to alternatively disconnect at least one of the two rear axle shafts 8A, 8B from the other one of the two rear axle shafts 8B, 8A when one of the two rear wheels 9C, 9D rolls at a greater speed than the other one of the two rear wheels 9D, 9C during a turning movement of the vehicle 1. As such, both the front and rear differentials 18 and 20 function to generally maintain the associated axle shafts 7A, 7B and 8A, 8B connected together, so that in the event that one wheel 9A, 9B or 9C, 9D slips, the other wheel 9B, 9A or 9D, 9C receives all the torque from the associated propeller shaft 14, 16, respectively, but also permits the "outer" wheel 9A, 9B and/or 9C, 9D to roll faster than the associated "inner" wheel 9B, 9A or/and 9D, 9C during vehicle turning.

With the structure above, the power train 10 of the present invention enables the vehicle 1 to function in all-wheel drive and through a relatively substantial range of speeds, preferably from zero miles per hour (0 mph) through at least twenty-five (25) mph, and to operate the vehicle generally without loss of traction, without the necessity of the operator performing any shifting, axle-locking or other such control operation. Having described the basic elements and structure of the power train 10 of the present invention, each of these and other components are described in detail below.

Figure 2:
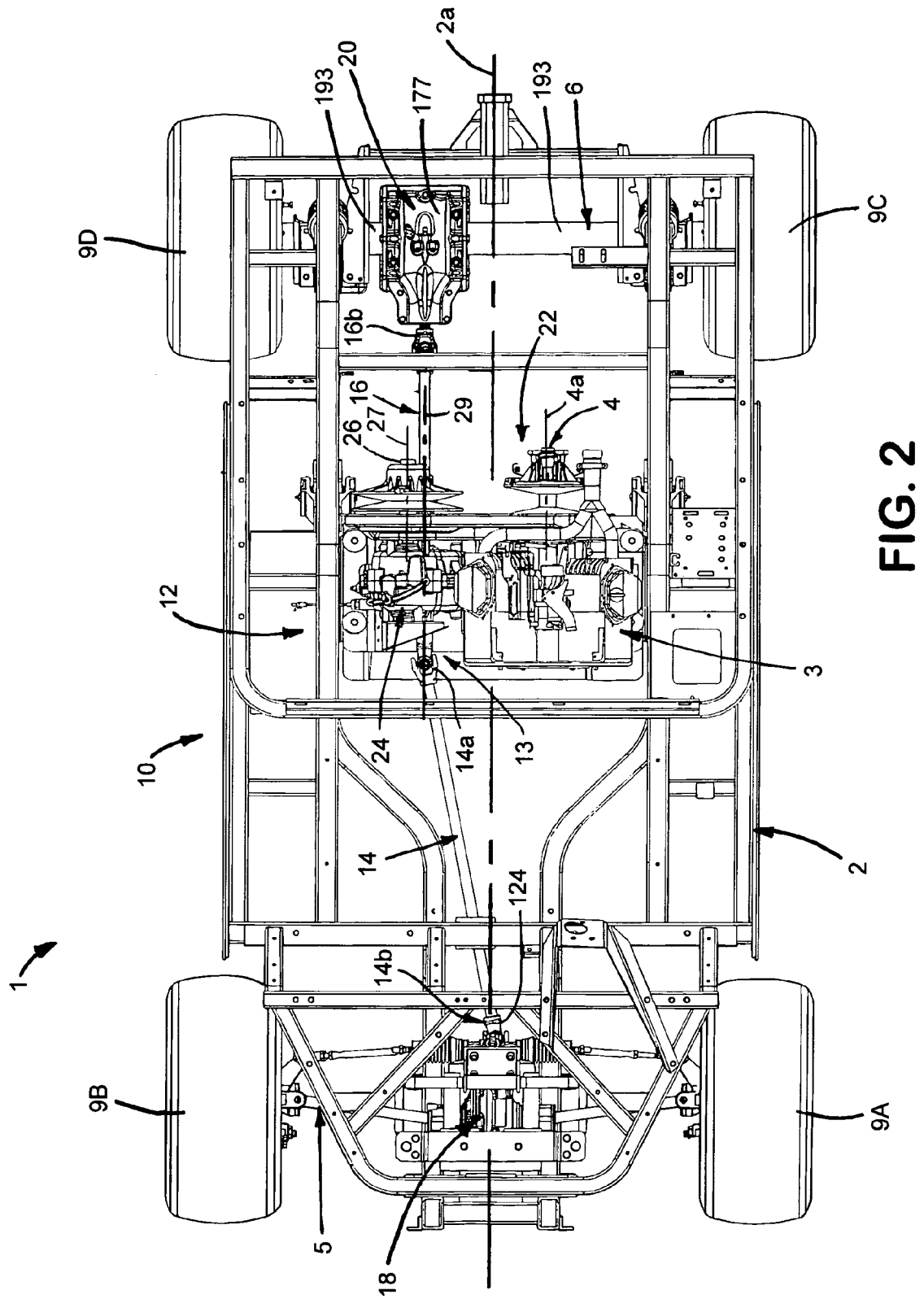
FIG. 2 is a top plan view of the power train, shown mounted to a frame of the vehicle.

Referring first to FIGS. 1 and 2, the power train 10 is preferably used with a vehicle 1 that is generally sized so as to operate as a utility vehicle for use in golf courses, factories, parks, etc., or for use as a neighborhood utility vehicle ("NEV") for travelling relatively short distances from a home. However, the basic structure of the power train 10 and all novel components thereof may be used in any other appropriate application, such as in generally larger sized automobiles, trucks, etc.

Preferably, the frame 2 has a longitudinal centerline 2a and is preferably constructed as a generally rectangular truss formed of a plurality of bars or beams, but may be formed in any appropriate manner. The engine 3 is preferably located generally centrally on the frame 2 so as to be spaced longitudinally from each of the front and rear axles 5, 6, respectively, and is oriented such that the axis 4a of the engine output shaft 4 extends generally parallel with respect to the frame centerline, and thus generally perpendicular to each axle 5, 6. Further, the engine 3 is preferably a standard internal combustion engine, most preferably fueled by gasoline or diesel fuel, but the power train 10 may alternatively be used with any other type of engine, such as for example, a fuel cell engine or a gas-electric hybrid engine. The scope of the present invention embraces these and all other appropriate applications of the power train 10.

Referring now to FIGS. 4-7, the CV transmission unit 22 is preferably a "belt drive" type of transmission and is configured to automatically increase the speed ratio $R_T$ ($S_E/S_I$) when the engine shaft speed $S_E$ increases and to decrease the speed ratio $R_T$ when torque on the input shaft 26 increases. Preferably, the CV transmission unit 22 basically includes a drive pulley 36 mounted on the engine shaft 4, a driven pulley 38 mounted on the gearbox input shaft 26 and a continuous flexible element 40 driveably engaging the drive and driven pulleys 36, 38, respectively, each being described in detail below. Although a belt type of drive is preferred, the CV transmission unit 22 may be any other appropriate type of CV transmission, such as for example a disk and wheel unit, a cone and wheel device, a toroidal CVT, a planetary gear set and gyroscope unit, a ratchet CVT, etc. In addition, the power train 10 may include a transmission unit 22 that is a "non-continuously" variable transmission, such as a spur, bevel and/or planetary gear train or a non-variable belt drive, although such an arrangement would not provide certain desired features of the present invention as described herein.

Figure 4:
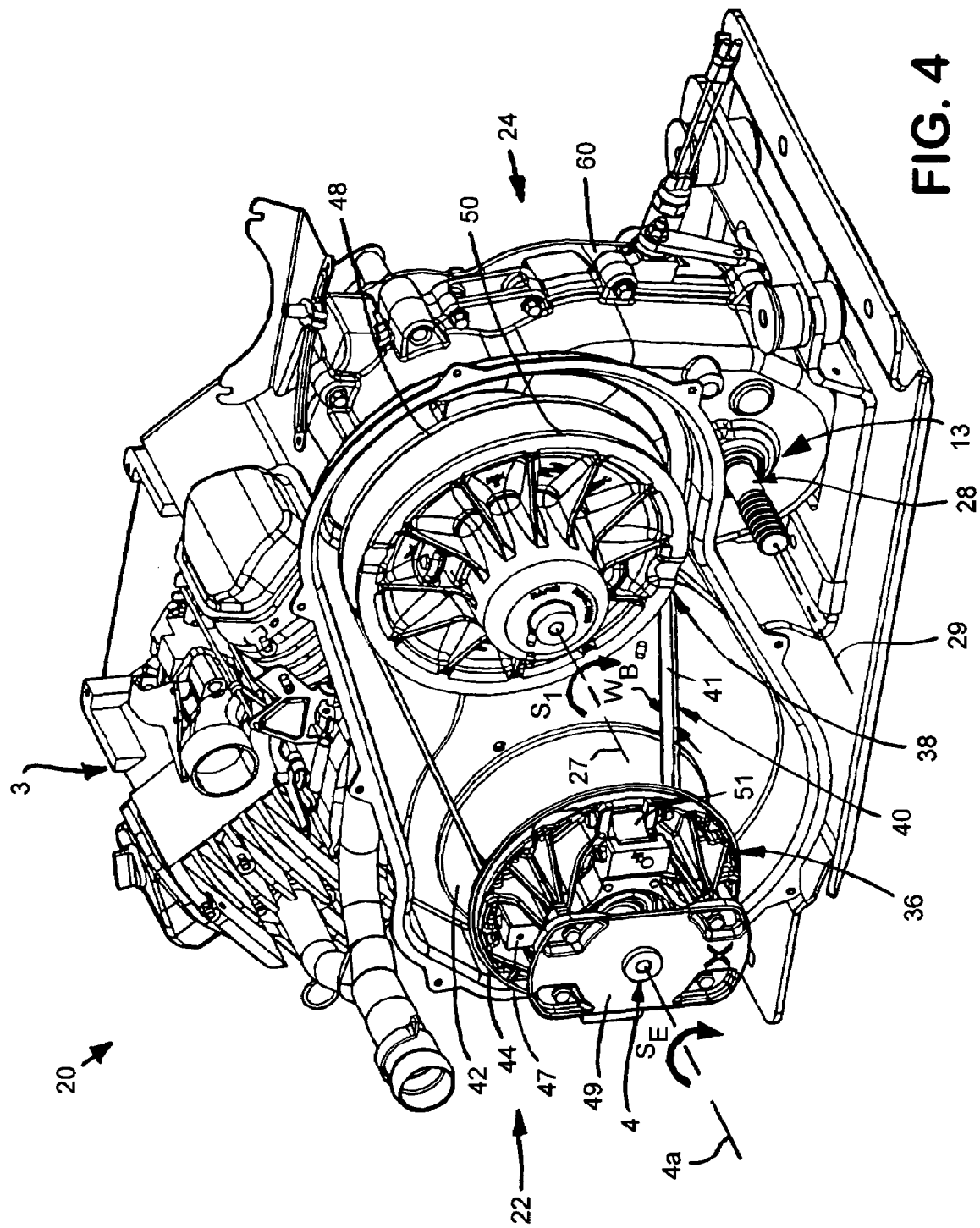
FIG. 4 is a perspective view of a transmission of the power train, shown connected with the engine.
Figure 5:
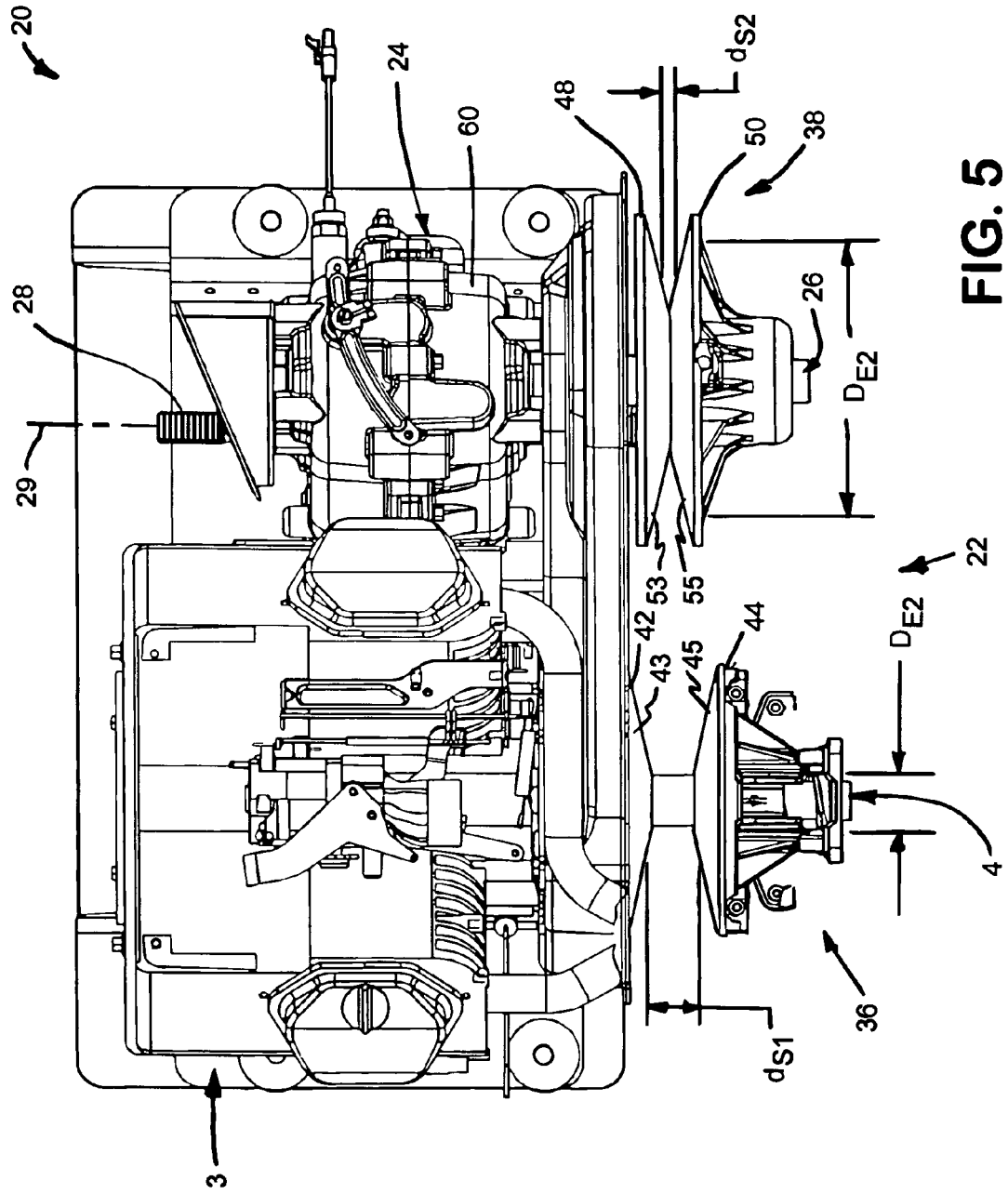
FIG. 5 is a top plan view of the transmission and engine.
Figure 6:
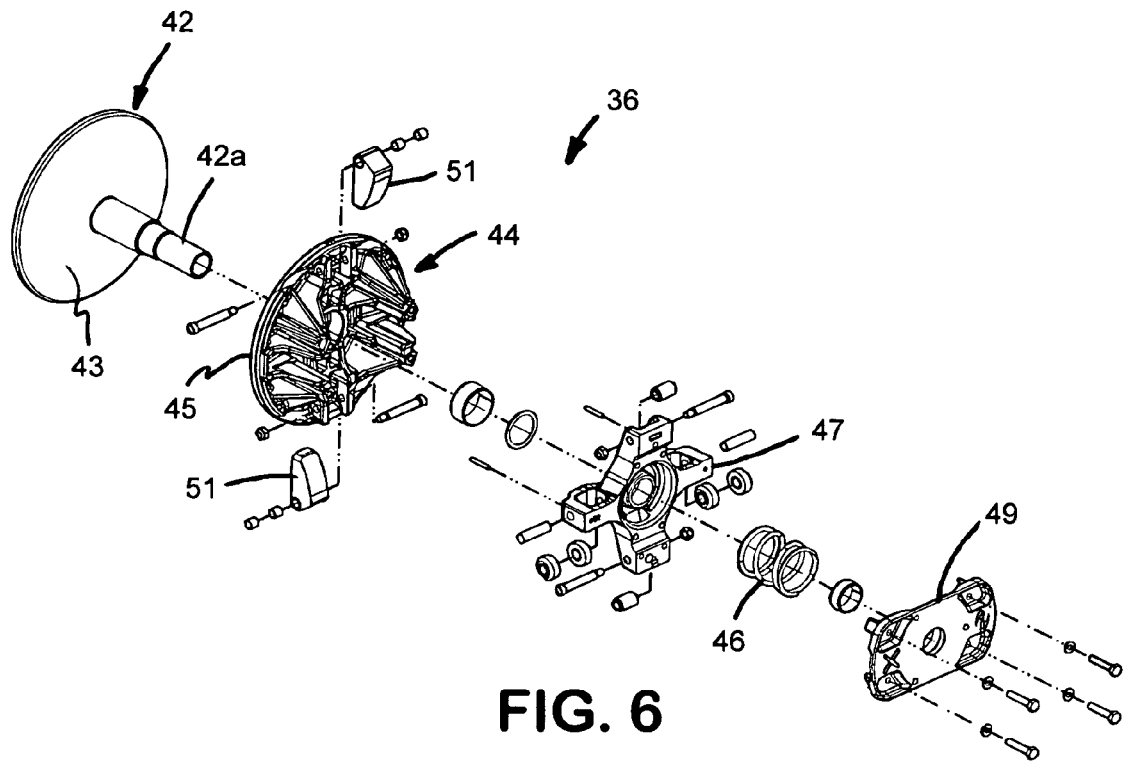
FIG. 6 is an exploded view of a first or "drive" pulley of the transmission.

Referring to FIGS. 4, 5 and 6, the drive pulley 36 is connected with the engine shaft 3a and has a variable effective diameter $D_{E1}$ (FIG. 5) or "pitch diameter", i.e., the diameter at which the flexible element 40 is driven so as to establish the tangential velocity at an effective diameter $D_{E2}$ (FIG. 5) of the driven pulley 38, as discussed below. The drive pulley 36 is configured such that the pulley effective diameter $D_{E1}$ increases when engine shaft speed $S_E$ increases and the effective diameter $D_{E1}$ decreases when torque on the input shaft 26 increases. Preferably, the drive pulley 36 includes first and second sheaves 42, 44 disposed on the engine shaft 4 and a biasing member 46 configured to bias the second sheave 44 generally away from the first sheave 42. More specifically, each drive pulley sheave 42, 44 is preferably formed as a generally annular disk with a frustaconical portion providing a tapered working surface 43, 45, respectively. The two sheaves 42, 44 are arranged with respect to each other such that the two working surfaces 43, 45 are generally facing, the flexible element 40 being generally "sandwiched" between facing annular sections (not indicated) of the two surfaces 43, 45 that are spaced apart by about the width $W_B$ (FIG. 4) of the element 40. With this structure, the drive pulley effective diameter $D_{E1}$ is varied or adjusted by the varying the axial spacing distance $d_{S1}$ between the two sheaves 42, 44. In other words, when the spacing distance $d_{S1}$ increases (i.e., the sheaves 42, 44 move apart), the flexible element 40 slides radially-inwardly along the tapered working surface 43, 45, thereby decreasing the effective diameter $D_{E1}$. Conversely, when the spacing distance $d_{S1}$ decreases (i.e., the sheaves 42, 44 move toward each other), the flexible element 40 is pushed radially outwardly along the tapered working surfaces 43, 45 so as to increase the effective diameter $D_{E1}$.

Referring particularly to FIGS. 4 and 6, the first sheave 42 is preferably formed as to further include a central stub shaft 42a and the second sheave 44 is preferably slidably disposed on the shaft 42a. The drive pulley 36 also preferably includes a first retainer member 47 connected with the outer end of the stub shaft 42a and a second retainer member 49 attached to the second sheave 44 and spaced axially from the first member 47. The biasing member 46, which is preferably a coil spring, extends between the two retainer members 47, 49 and is configured to bias the second member 49 generally away from the first member 47, and thereby bias the second sheave 44 generally away from the first sheave 42. Further, a pair of weighted levers 51 are pivotally attached to the second sheave 44 and are contactable with the first retainer member 47.

With this structure, when the engine shaft 4 rotates at a sufficiently high speed $S_E$, centrifugal force causes the weighted levers 51 to pivot radially outwardly from the axis 4a and push against the first retainer member 47 (fixed to the first sheave 42). Such movement of the weighted levers 51 causes the second sheave 44 (and second retainer member 49) to slidably displace on the stub shaft 42a toward the first sheave 42, against the biasing force of the biasing member 46, so as to thereby increase the drive pulley effective diameter $D_{E1}$. When the engine output shaft 4 rotates at a lesser or slower speed, the weighted levers 51 pivot inwardly toward the shaft axis 4a, enabling the biasing member 46 to push the second retainer member 49 to displace generally away from the first retainer member 47. During such displacement, the second member 49 "carries" the second sheave 44 to slidably displace on the stub shaft 42a away from the first sheave 42, thereby decreasing the drive pulley effective diameter $D_{E1}$.

Figure 7:
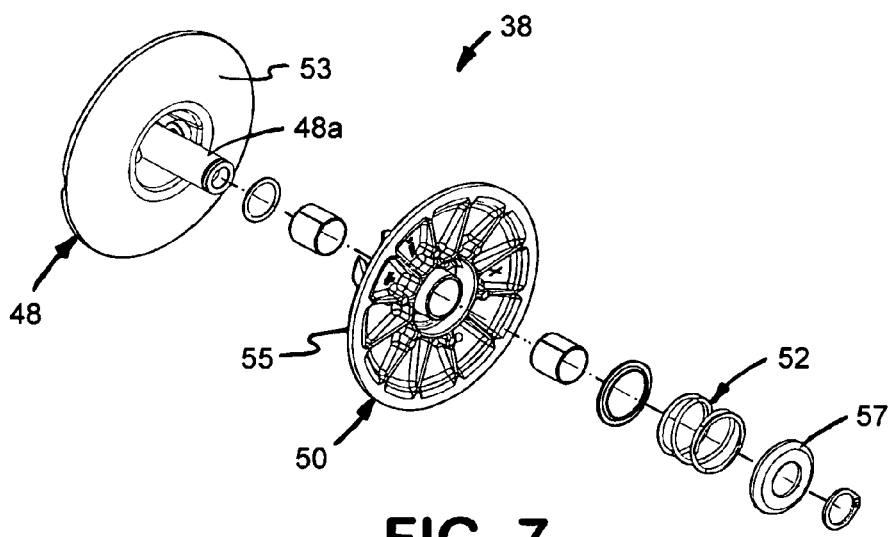
FIG. 7 is an exploded view of a second or "driven" pulley of the transmission.

Referring to FIGS. 4, 5 and 7, the driven pulley 38 is connected with the gearbox input shaft 26 and has a variable effective diameter $D_{E2}$ (FIG. 5). The driven pulley 38 is configured such that the driven pulley effective diameter $D_{E2}$ increases when the drive pulley effective diameter $D_{E1}$ decreases and decreases when the drive pulley effective diameter $D_{E1}$ increases, as discussed in further detail below. Preferably, the driven pulley 38 includes first and second sheaves 48, 50 disposed on the input shaft 26 and a biasing member 52 configured to bias the second sheave 50 generally toward the first sheave 48. More specifically, each driven pulley sheave 48, 50 is preferably formed in a generally similar manner as the two drive pulley sheaves 42, 44, i.e., as a generally annular disk with a frustaconical portion providing a tapered working surface 53, 55, respectively.

As with the drive pulley 36, the driven pulley effective diameter $D_{E2}$ is varied or adjusted by the varying the axial spacing distance $d_{S2}$ between the two sheaves 48, 50. Specifically, when the spacing distance $d_{S2}$ increases, the flexible element 40 slides radially-inwardly along the tapered working surfaces 53 and 55 such that the pulley effective diameter $D_{E2}$ decreases. Alternatively, when the spacing distance $d_{S2}$ decreases, the flexible element 40 is pushed radially outwardly along the tapered working surfaces 53 and 55 such that the effective diameter $D_{E2}$ increases. Preferably, the first sheave 48 is formed so as to further include a central stub shaft 48a, with the second sheave 50 being slidably disposed on the shaft 48a, and the biasing member 52 is preferably a coil spring. The driven pulley 38 preferably further includes a retainer member 57 connected with the free end of the stub shaft 48a, the biasing member 52 being disposed on the shaft 48a so as to extend between the second sheave 50 and the retainer member 57. With this structure, the biasing member 52 generally biases or pushes the second sheave 50 away from the retainer member 57, and thus generally toward the first sheave 48.

Furthermore, the two sheaves 42, 44 of the drive pulley 36 and the two sheaves 48, 50 of the driven pulley 38 are relatively sized such that the CV transmission unit 22 is able to achieve engine speed-to-input shaft speed ratios $R_T$ in the range of less than 1 and greater then 3, and most preferably about 0.6 to about 3.6, as discussed above. As such, each one of the two driven pulley sheaves 48 and 50 is sized generally substantially larger than each of the two drive pulley sheaves 42 and 44.

Figure 3:
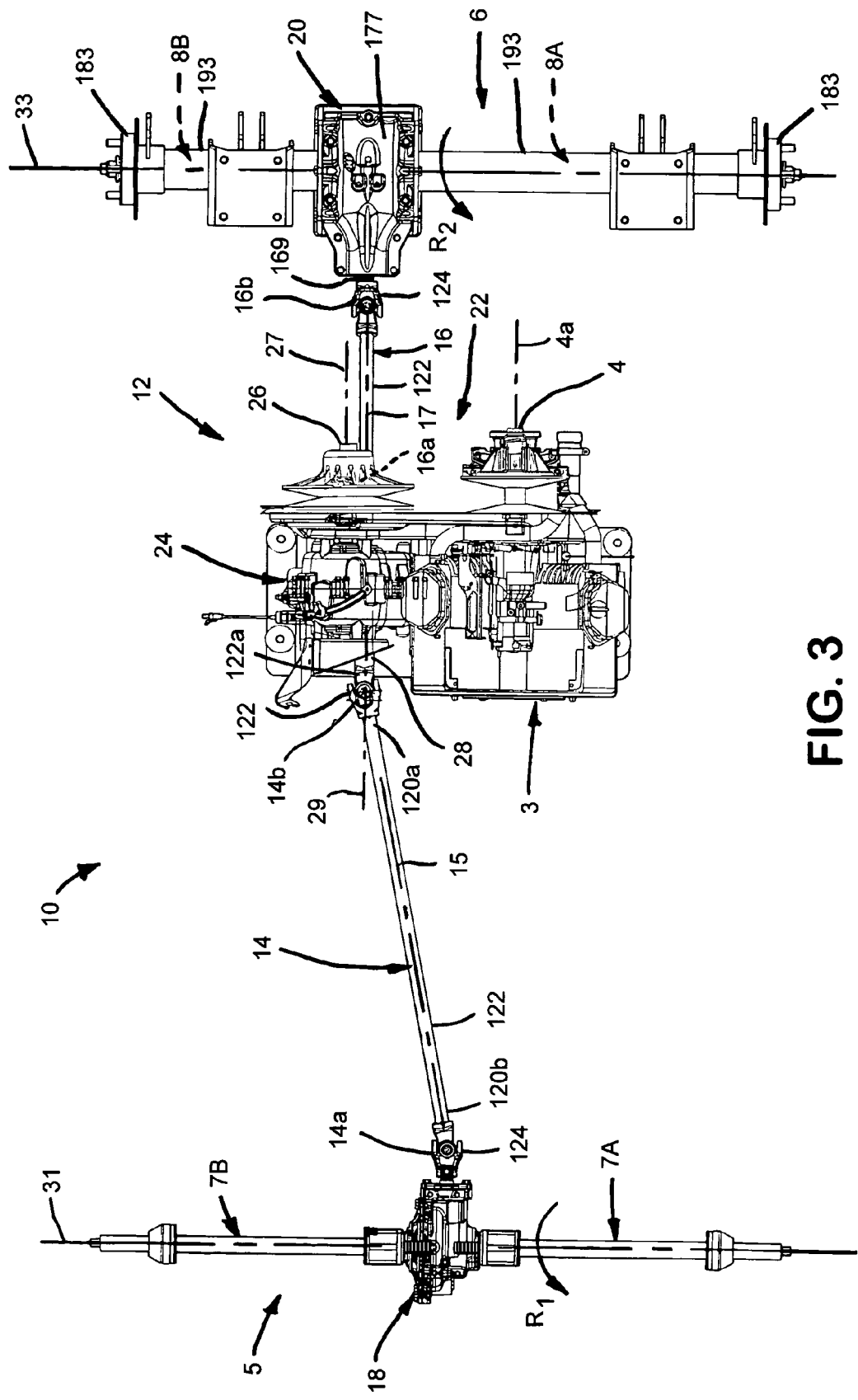
FIG. 3 is another top plan view of the power train, shown separated from the frame.

Referring to FIGS. 3 and 4, the flexible continuous element 40 is disposed about each of the two pulleys 36 and 38 so as to operatively couple the engine shaft 4 with the gearbox input shaft 26. The flexible element 40 has a generally fixed circumferential length (not indicated) and is preferably formed as a conventional belt 41, most preferably as a polymeric V-belt, but may alternatively be constructed as any other appropriate flexible continuous mechanical elements, such as for example, a flat belt, a chain, etc. The belt 41 basically functions to transmit torque from the engine shaft 4 to the gearbox input shaft 26 such that the engine shaft rotatably drives the input shaft 26, either at a speed reduction (speed ratio $R_T>1$) or at an speed increase or "overdrive" condition (speed ratio $R_T<1$). Due to the fixed length of the belt 41, when the drive pulley effective diameter $D_{E1}$ increases with increasing engine shaft speed $S_E$, the portion of the belt 41 disposed about the drive pulley 36 also increases, reducing the amount of belt length available to the driven pulley 38. Such "take-up" of a greater portion of the belt length by the drive pulley 36 pulls the belt 41 radially inwardly on the driven pulley 38, causing the belt 41 to "wedge-apart" the two driven pulley sheaves 48, 50. In other words, the belt 41 acts upon the driven pulley 38 such that the driven pulley second sheave 50 displaces generally away from the driven pulley first sheave 48, against the biasing action of the biasing member 52, so as to decrease the effective diameter $D_{E2}$ of the driven pulley 38 and thereby increase the transmission speed ratio $R_T$. When the engine shaft speed $S_E$ decreases such that the drive pulley effective diameter $D_{E1}$ decreases, the belt 41 slackens about the driven pulley 38, permitting the biasing member 52 to displace the second sheave 48 towards the first sheave 50, increasing the second pulley effective diameter $D_{E2}$ and reducing the transmission speed ratio $R_T$. Thus, the CV transmission unit 22 is configured such that the transmission speed ratio $R_T$ automatically decreases when the rotational speed $S_E$ of the engine shaft 4 increases, such that gearbox input and output shafts 26 and 28 rotate at a greater or higher speed $S_1$, and the speed ratio $R_T$ automatically increases when engine shaft rotational speed $S_E$ decreases, such that two gearbox shafts 26, 28 rotate at a lesser or lower speed $S_1$.

Further, when torque load on the input shaft 26 increases, such as when the vehicle 1 begins to move up a sloped surface, a greater amount of torque is required from the engine shaft 4 to rotate the input shaft 26, which increases the tension in the belt 41. The increased tension in the belt 41 and resistance to rotation by the input shaft 26 causes the belt 41 be pulled radially inwardly against the drive pulley 36 toward the engine shaft 4. As such, the belt 41 wedges between the two drive pulley sheaves 42, 44, which forces the movable or slidable sheave 44 to displace away from the fixed sheave 42, thereby decreasing the drive pulley effective diameter $D_{E1}$.

As the amount of belt length about the drive pulley decreases, the belt 41 slackens about the driven pulley 38 such that the driven pulley biasing member 52 pushes the movable second sheave 50 toward the fixed first sheave 48, increasing the effective diameter $D_{E2}$ until the slack is taken up by the two sheaves 48, 50. Thus, the transmission speed ratio $R_T$ increases automatically when torque on the input shaft 26 increases, thereby causing the gearbox input and output shafts 26, 28 to be driven at a lesser or lower speed.

Referring to FIGS. 2-5 and 8-13, the gearbox 24 is preferably located generally centrally on the vehicle frame 2 so as to be spaced laterally from the engine 3 and longitudinally from each of the two axles 5, 6. As mentioned above, the gearbox 24 is preferably oriented on the frame 2 such that the input shaft axis 27 and the output shaft axis 29 each extend generally parallel with respect to the engine shaft axis 4a, and generally parallel with respect to the frame centerline 2a. Such an arrangement of the transmission 12 and the engine 3 permits the vehicle 1 to utilize an engine 3 that is configured as an inline engine, as well as typical V-twin engines and other types of engines, and eliminates any 90° bevel gear arrangements typically required when an engine shaft extends perpendicularly with respect to a transmission output shaft.

Preferably, the gear box 24 further includes a housing 60 configured to partially contain the input shaft 26 and the output shaft 28, and other components of the gear box 24 as described below. The gearbox housing 60 also functions to relatively position the input and output shafts 26, 28, such that the two shaft axes 27, 29 are generally parallel with each other and the input shaft 26 is spaced generally above the output shaft 28, and to rotatably support the two shafts 26, 28. Preferably, the housing 60 has an exterior surface 60a and an interior surface 60b bounding an interior chamber $C_H$, with each one of the input shaft 26 and the output shaft 28 being partially disposed within the interior chamber $C_H$ and extending outwardly from the exterior surface 60a. Preferably, the housing 60 also includes an upper, first opening 62 and a pair of aligned second openings 64A, 64B, each opening 62, 64A and 64B extending between the exterior surface 60a and the interior chamber $C_H$. The input shaft 26 extends through the housing first opening 62 such that a connective section 26a of the shaft 26 is disposed externally of the housing 60 and a gear-mounting section 26b is disposed within the housing chamber $C_H$. Alternatively, the input shaft 26 may be formed relatively axially longer so as to include a second connective section (not shown) extending through the other first opening 64B, such that a power take-off device (not shown) may be operably coupled with the second connective section. Further, the output shaft 28 extends through both second openings 64A and 64B such that two connective sections 28a, 28c extend from opposing sides of the housing 60 and a central, gear-mounting section 28b is disposed within the chamber $C_H$. Preferably, the two shafts 26, 28 are rotatably connected with the housing 60 by two pairs of bearings 66, three bearings 66 being disposed adjacent to a separate one of three housing openings 62, 64A and 64B and a fourth bearing 66 being generally aligned with the bearing 66 adjacent to the first opening 62.

Furthermore, the gearbox housing 60 is preferably formed of two generally ovular-shaped shell halves 61A, 61B releasably connected together by a plurality of threaded fasteners (not indicated) so as to form a generally rectangular box. Preferably, each shell half 61A, 61B includes three annular wall sections 63 extending from the housing interior surface 60b into the interior chamber $C_H$, two wall sections 63 on the first half 61A extending circumferentially at least partially about the shaft openings 62 and 64A and one wall section 63 on the second shell half 61B extending circumferentially at least partially about the shaft opening 64B. Each annular wall section 63 is sized to receive a separate one of the bearings 66 so as thereby connect the bearing 66 with the housing 60. Although preferably formed as described above, the housing 60 may be formed in any other appropriate manner, such as being constructed of three or more shell portions or wall members, and/or may have any other appropriate shape, such as generally square, spherical or hemispherical.

Referring to FIGS. 8-12, the input shaft 26 is preferably formed as a generally solid, generally circular bar 65 through which the input shaft axis 27 longitudinally extends. The bar 65 has an enlarged central portion 65a and first and second end portions 65b, 65c extending axially from the central portion 65a. The first end portion 65b is preferably sized relatively axially longer than the second end portion 65c and includes a plurality of axially extending splines 59 configured to engage with the driven pulley 38, so as to form the input shaft connective portion 26a. Further, the output shaft 28 is preferably formed as a generally solid, generally circular bar 67 through which the output axis 29 extends longitudinally. The bar 67 has an enlarged central portion 67a and first and second end portions 67b, 67c extending axially from the central portion 67a. Each output shaft end portion 67b, 67c includes a first, outer set of radially-outwardly extending axial splines 68A, 68B, respectively, configured to engage with one of the two propeller shafts 14, 16, as discussed below, so as to form the two connective portions 28a, 28c, and a second, inner set of radially-outwardly extending axial splines 69A, 69B configured to engage with a gear 82 and a sprocket 92, respectively, as discussed below.

Figure 13:
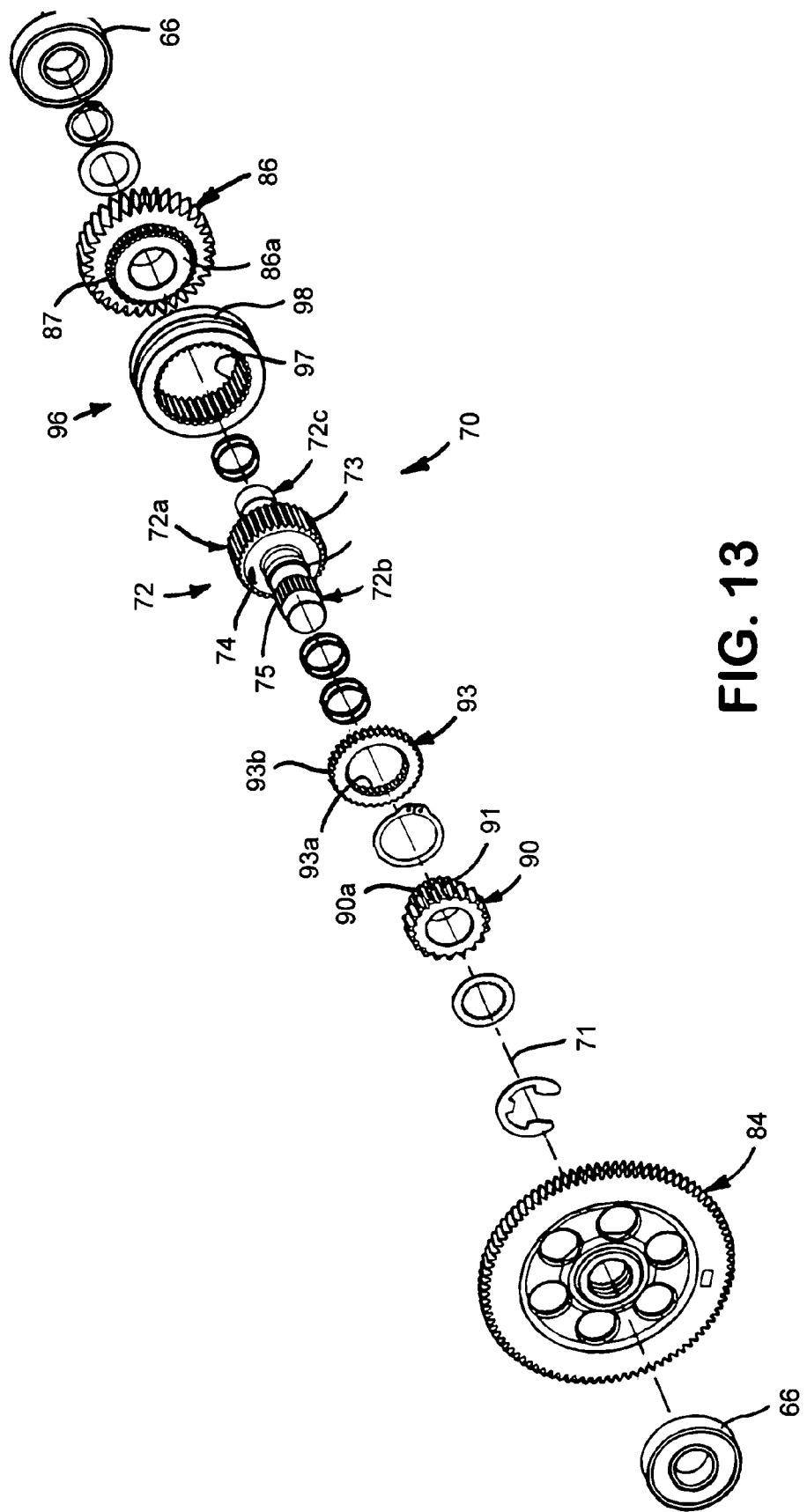
FIG. 13 is an exploded view of an intermediate shaft of the gearbox.

Referring to FIGS. 8-10 and 13, the gearbox 24 further includes an intermediate shaft 70 disposed within the housing 60 generally between the input shaft 26 and the output shaft 28. The intermediate shaft 70 is rotatably connected with the housing 60 by another pair of bearings 66 disposed within a central pair of aligned wall sections 63, so as to be rotatable about a third axis 71 extending generally parallel with respect to the first and third axes 27, 29. Further, the intermediate shaft 70 is operably coupled with the input shaft 26 and is operatively coupleable with the output shaft 28, such that the input shaft 26 rotatably drives the output shaft 28 through the intermediate shaft 70. Preferably, the intermediate shaft 70 is formed as a generally solid, generally circular bar 72 through which the third axis 71 extends longitudinally. As best shown in FIG. 13, the bar 72 has an enlarged central portion 72a and first and second end portions 72b, 72c extending axially from the central portion 72a. The central portion 72a includes a plurality of radially-outwardly extending axial splines 73 and forms a coupler hub 74 configured to rotatably couple a dog clutch 96 with the intermediate shaft 70, as discussed below. Further, the first end portion 72b includes a set of radially-outwardly extending axial splines 76 configured to engage with a spur gear 84, as discussed in further detail below.

Figure 8:
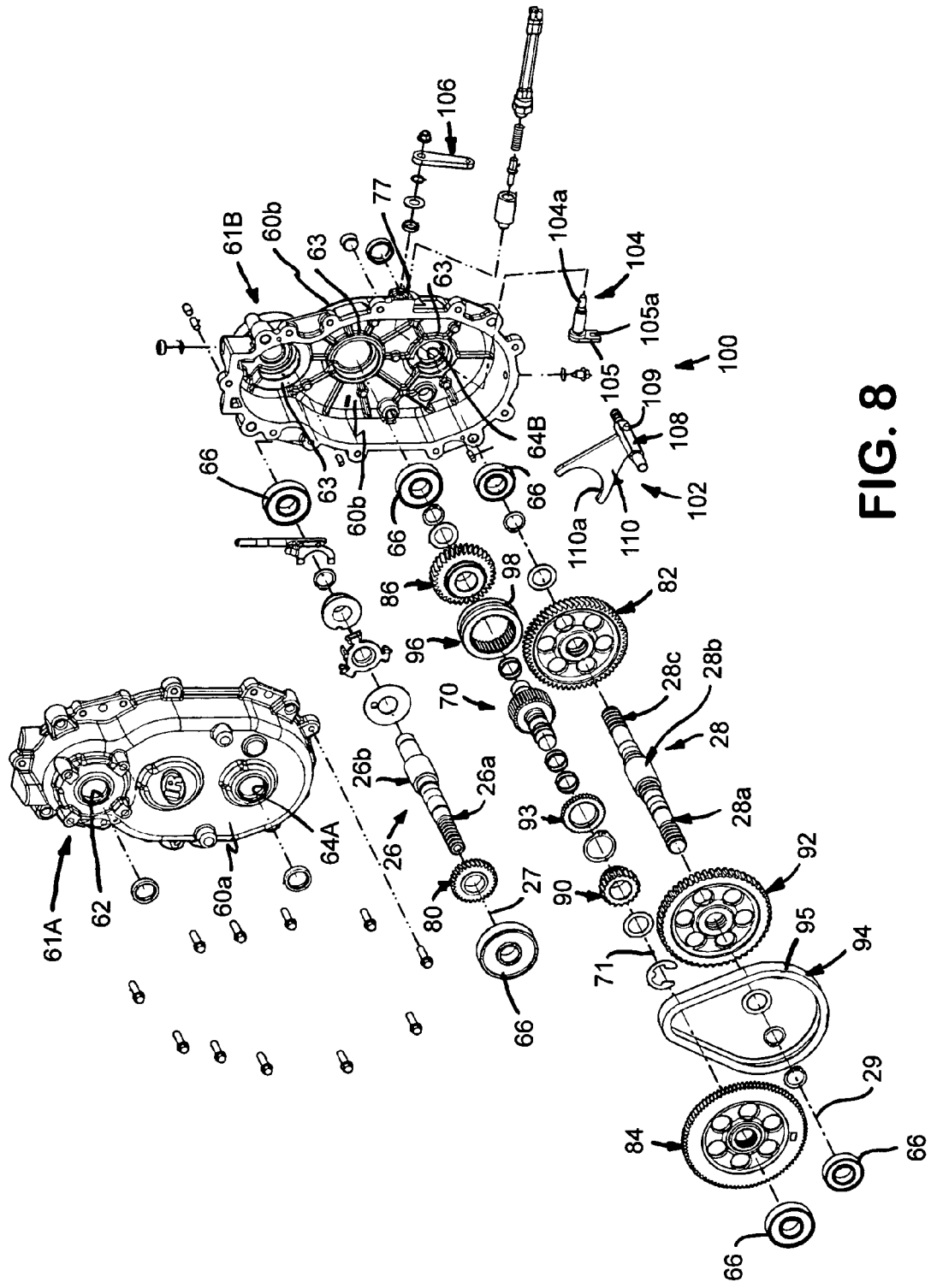
FIG. 8 is an exploded view of a gearbox of the transmission.
Figure 9:
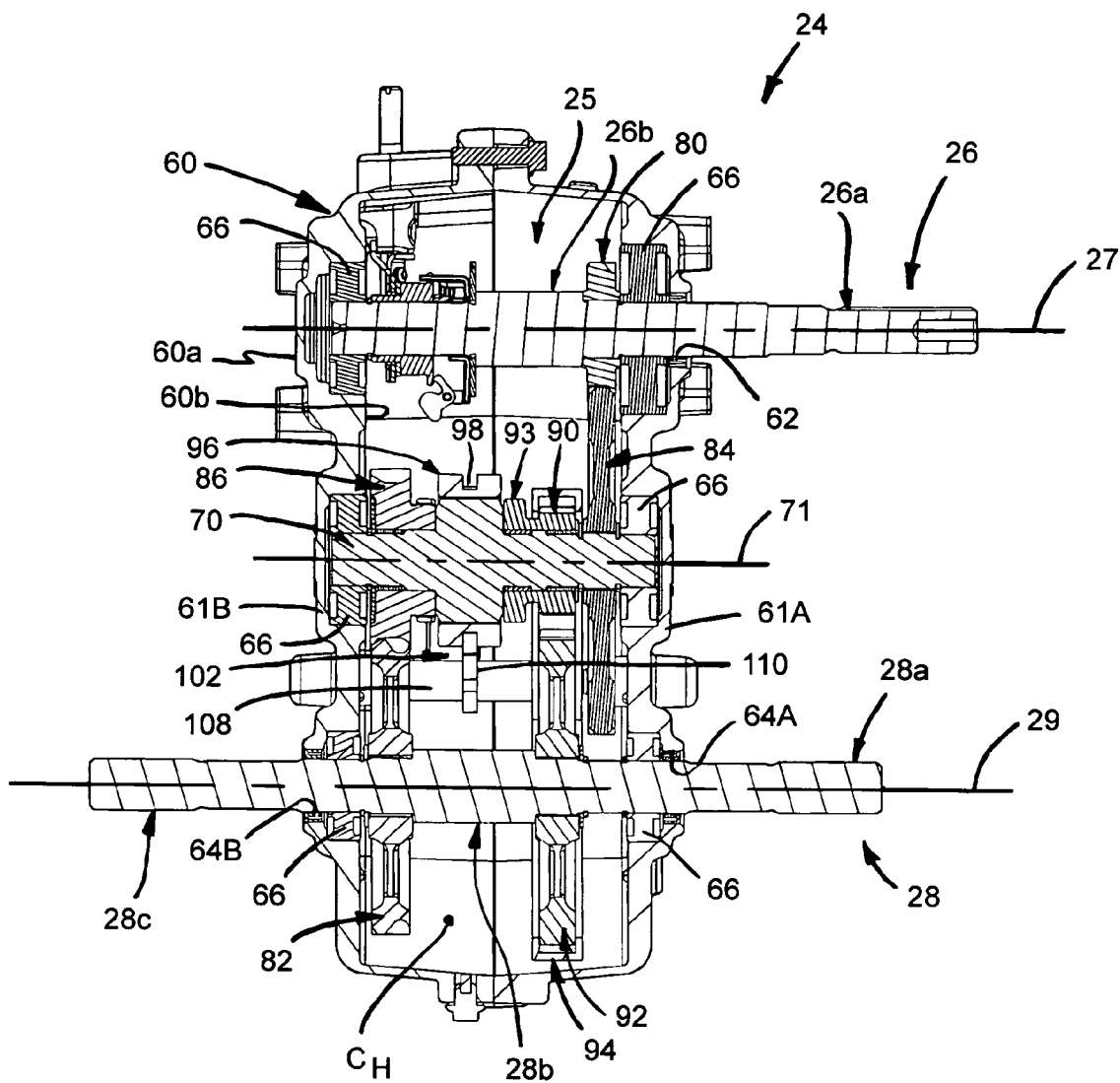
FIG. 9 is a cross-sectional view of the gearbox.
Figure 10:
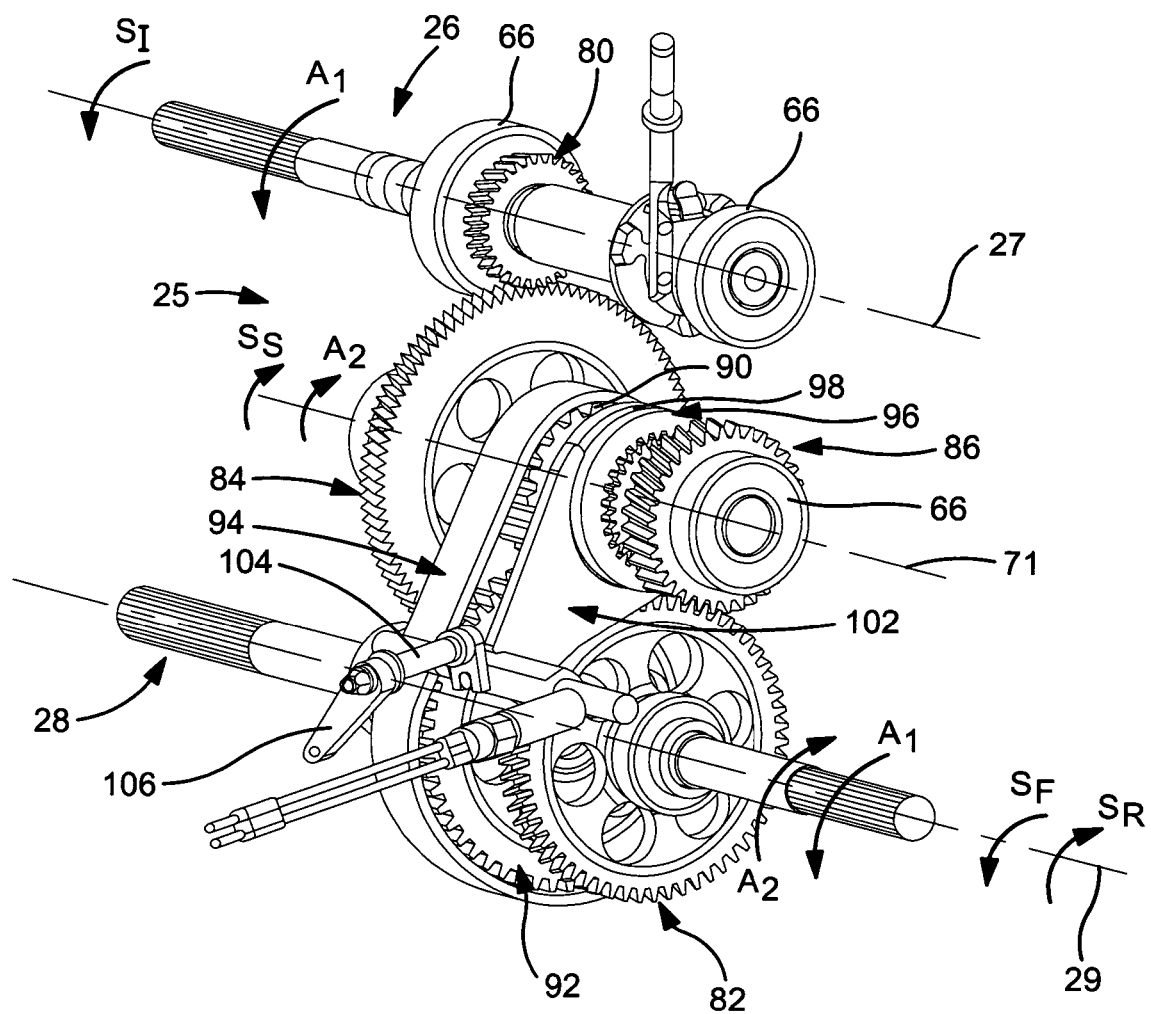
FIG. 10 is a perspective view of the components of the gearbox, shown separated from a housing of the gearbox.

Referring now to FIGS. 8-13, the gearbox 24 preferably includes a gear train 25 formed primarily of four spur gears 80, 82, 84 and 86 and two sprockets 90, 92 and configured to transmit rotational movement of the input shaft 26 in a single angular or rotational direction $A_1$ to rotation of the output shaft 28 in either of the two opposing rotational directions $A_1$ or $A_2$ (see FIG. 10). The gear train 25 includes a first spur gear 80 fixedly disposed on the input shaft 26 and a second spur gear 82 fixedly disposed on the output shaft 28. A third spur gear 84 is fixedly disposed on the intermediate shaft 70 and is engaged with the first gear 80 on the input shaft 26. Further, a fourth spur gear 86 is rotatably disposed on the intermediate shaft 70 and is engaged with the second gear 82 on the output shaft 28. The fourth gear 86 has a hub portion 86a with a set of radially-outwardly extending axial splines 87 engageable with the dog clutch 96, as discussed below, so as to releasably connect or couple the gear 86 with the shaft 70.

With this gear train structure, the input shaft 26 drives the output shaft 28 to rotate in the first angular or rotational direction $A_1$ in the following manner. The first gear 80 rotates at the speed $S_I$ of the input shaft 26 (i.e., as effected by the CV unit 22) and rotatably drives the third gear 84 on the intermediate shaft 70, causing the intermediate shaft 70 to rotate in the opposing, second rotational direction $A_2$ and at an intermediate speed $S_S$ as reduced by a first gear reduction $G_1$. Such rotation of the intermediate shaft 70 causes the fourth gear 86, when coupled with the shaft 70, to rotatably drive the second gear 82 on the output shaft 28, such that output shaft 28 rotates in the first rotational direction $A_1$ at a "forward" output speed $S_F$ as reduced by a second gear reduction $G_2$. Most preferably, the output shaft 28 is preferably driven by the input shaft 26 in the first or "forward" rotational direction $A_1$ at a total gear reduction ratio $G_{TF}$ of about four point nine eight (4.98).

However, the four gears 80, 82, 84 and 86 may alternatively be configured to provide any appropriate, desired gear ratio. Further, the gearbox 24 may alternatively include a second intermediate shaft (not shown) disposed between the input and intermediate shafts 26, 70 or the intermediate and output shafts 70, 28, and/or may include other types of gears, such as worm gears, planetary gears, etc., either in combination with or in place of the spur gears 80, 82, 84 and 86.

Still referring to FIGS. 8-13, stated above, the gear train 25 also includes a first sprocket 90 rotatably disposed on the intermediate shaft 70 and having a hub portion 90a with a plurality of radially-outwardly extending axial splines 91. A generally annular coupler member 93 has a plurality of radially-inwardly extending splines 93a engaged with the first sprocket 90 and a plurality of radially-outwardly extending splines 93b engageable with the dog clutch 96, as discussed below, to releasably connect or couple the sprocket 90 with the shaft 70. A second sprocket 92 is fixedly disposed on the output shaft 28 and a flexible continuous element 94, preferably a chain 95, is disposed about and driveably engages the first and second sprockets 90, 92, respectively, such that the two sprockets 90, 92 (and thus the two shafts 70, 28) rotate in the same rotational direction $A_2$. With this structure, the input shaft 26 drives the output shaft 28 to rotate in the second or "reverse" rotational direction $A_2$ in the following manner.

As discussed above, the first gear 80 rotates at the input shaft speed $S_I$ and rotatably drives the third gear 84 on the intermediate shaft 70, causing the intermediate shaft 70 to rotate in the second angular direction $A_2$ at the intermediate speed $S_I$. Such rotation of the intermediate shaft 70 causes the first sprocket 90, when coupled with the shaft 70, to rotatably drive the second sprocket 92 on the output shaft 28. As such, the intermediate shaft 70 rotatably drives the output shaft 28 in the second direction $A_2$ at a second or reverse output speed $S_R$ as reduced by a sprocket reduction ratio $R_S$. Preferably, the first and second sprockets 90, 92, respectively, each having working diameters relatively sized such that the output shaft 28 is driven in the second or "reverse" rotational direction $A_2$ at a total gear reduction ratio $G_{TR}$ of about seven point seven nine (7.79).

Preferably, mentioned above, the gear box 24 further includes a generally annular dog clutch 96 disposed at least partially about the coupler hub 74 of the intermediate shaft 70. The dog clutch 96 includes a plurality of radially-inwardly extending axial splines 97 engaged with the hub splines 73, so as to rotatably couple the clutch 96 with the shaft 70, and is slidable in opposing directions along the intermediate shaft axis 71. The clutch 96 is engageable with the fourth spur gear 86 when located at a first position with respect to the shaft 70 and is alternatively engageable with the coupler member 93, and thereby also with the first sprocket 90, when located at a second position with respect to the shaft 70. More specifically, when the clutch 96 is disposed in the first position, the clutch splines 97 engage the splines 87 on the fourth gear hub portion 86a so as to couple the dog clutch 96 with the gear 86, thereby coupling the gear 86 with the intermediate shaft 70. Thus, when the dog clutch 96 is engaged with the fourth gear 86, rotation of the input shaft 26 drives the output shaft 28 to rotate in the first, forward rotational direction $A_1$. Further, when the clutch 96 is disposed in the second position, the clutch splines 97 engage the outer splines 93b on the coupler member 93 so as to couple the dog clutch 96 with the sprocket 90, thereby coupling the first sprocket 90 with the intermediate shaft 70. Thus, when the dog clutch 96 is engaged with the first sprocket 90, rotation of the input shaft 26 drives the output shaft 28 to rotate in the second, reverse rotational direction $A_2$. In addition, the dog clutch 96 is also disposable in a third, intermediate position, located between the first and second positions, at which the clutch 96 is disengaged from or nonengaged with both the fourth gear 86 and the first sprocket 90, so as to provide a "neutral" setting of the power train 10. In other words, when the dog clutch 96 is located in the third, intermediate position, the intermediate shaft 70 is rotatable within the fourth gear 86 and the first sprocket 90 while the gear 86 and sprocket 90 remain generally stationary relative to the shaft 70, such that input shaft 26 will drive the intermediate shaft 70 without driving the output shaft 28.

Referring to FIGS. 8-10, the gearbox 24 preferably also includes a shifter assembly 100 coupled with the dog clutch 96 and configured to displace the dog clutch 96 between the first, third and second positions as described above. The shifter assembly 100 includes a fork 102 disposed within the housing interior chamber $C_H$ and engaged with the clutch 96, a shift member 104 rotatably disposed within a side opening 77 (FIG. 8) of the housing 60 and a crank lever 106 attached to the shift member 104. The fork 102 includes a base shaft portion 108 with a connective peg 109 and a plate portion 110 attached to the shaft portion 108. The plate portion 110 has an arcuate cutout 110a sized to fit about the dog clutch 96, specifically within an annular groove 98 in the clutch outer surface. Further, the shift member 104 includes an engagement tab 105 with a slotted opening 105a and the fork peg 109 is disposed within the opening 105a, such that rotation of the shift member 104 causes the engagement tab 105 to push or pull the fork 102 in opposing directions generally along the intermediate shaft axis 71, thereby displacing the dog clutch 96 in like fashion. Furthermore, the crank lever 106 is attached to an outer end 104a of the shift member 104 and is configured to rotate the shift member 104 within the side opening 77. The crank lever 106 is coupled with a shift controller (not shown) in the vehicle operator station (i.e., the driver's area; not shown), such that a vehicle operator or "driver" may shift the power train 10 between the forward, neutral and reverse settings by operating the shift controller.

Referring now to FIGS. 2 and 3, the first and second propeller shafts 14, 16 each basically includes an elongated, generally solid circular bar 120 and first and second connective members 122, 124, preferably U-joints, each disposed at a separate end 120a, 120b, respectively, of the bar 120. Each bar 120 is rotatable about the shaft axis 15 or 17 of the particular propeller shaft 14, 16, respectively, and is configured to transfer torque from the transmission output shaft 13 (i.e., gearbox shaft 28) to the associated axle 5, 6, the bar 120 of the front propeller shaft 14 preferably being sized so as to have a greater axial length than the bar 120 of the rear propeller shaft 16. Further, each first connective member 122 (only one shown) has a first portion 122a with a plurality of internal, radially-inwardly extending axial splines (not shown) engaged with the radially-outwardly extending splines 68A, 68B on the output shaft 28 so as to operably connect the propeller shafts 14, 16 with the transmission 12. Further, the second connective member 124 of each propeller shaft 14, 16 is connected with a pinion shaft 141, 174 of the front and rear differentials 18, 20, respectively.

Figure 14:
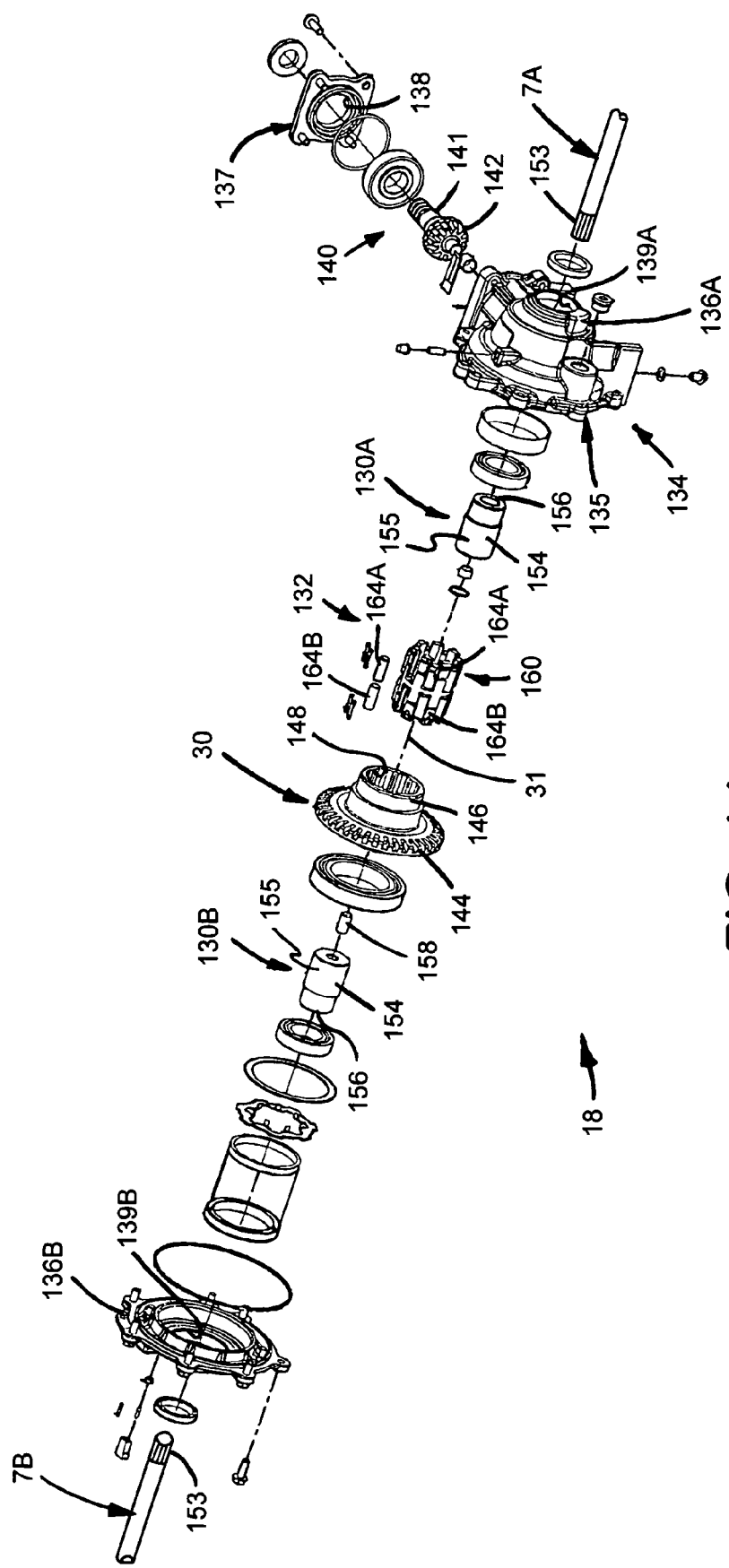
FIG. 14 is an exploded view of a front differential of the power train.
Figure 15:
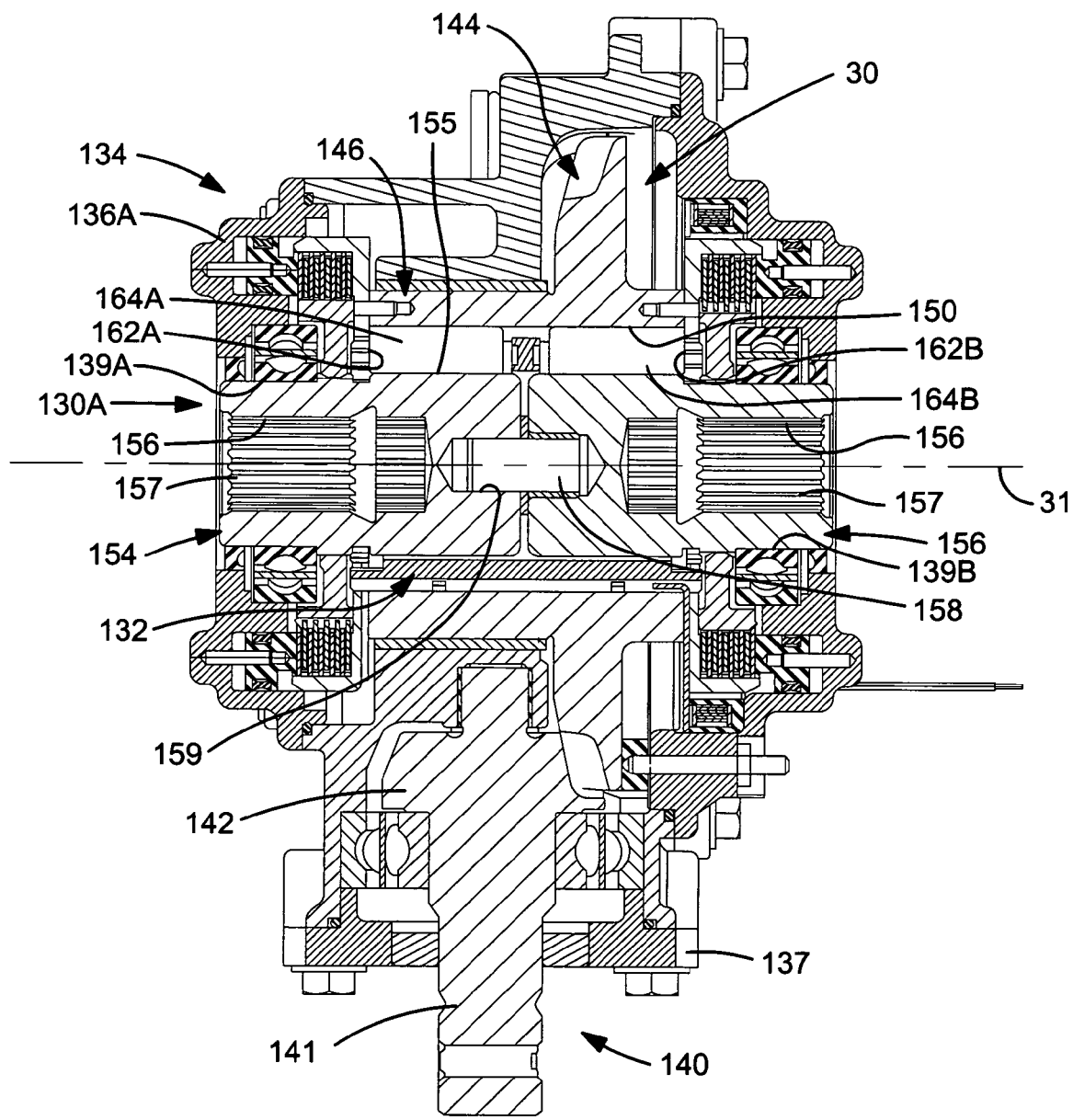
FIG. 15 is an enlarged, axial cross-sectional view of the front differential.

Referring to FIGS. 14-16, the front differential 18 basically includes, in addition to the gear member 30 discussed above, two side members 130A, 130B each connected with a separate one of the two front axle shafts 7A, 7B and a carrier 132 releasably connectable with the gear member 30 such that the first propeller shaft 14 rotatably drives the carrier 132. The carrier 132 is configured to engage the side members 130A, 130B with the gear member 30 when the side members 130A, 130B rotate at about the same speed as the gear member 30 and to disengage the side members 130A, 130B from the gear member 30 when the members 130A, 130B rotate at a greater speed than the gear member 30. Preferably, the carrier 132 is further configured to releasably connect with each one of the two side members 130A, 130B when the two front wheels 9A, 9B roll at about the same speed and to alternatively disconnect from one of the two side members 130A, 130B when the front wheel 9A or 9B connected with the one side member 130A, 130B, respectively, rolls at a greater speed than the other front wheel 9B, 9A. With this structure, when the carrier 132 is connected with the two side members 130A, 130B and is engaged with the gear member 30, each front axle shaft 7A and 7B receives about half of the torque transmitted to the gear member 30 from the first propeller shaft 14. Further, when one of the two side members 130A or 130B is disconnected from the carrier 132, the axle shaft 7B, 7A connected with the other side member 130B, 130A receives generally all of the torque transmitted to the gear member 30 from the first propeller shaft 14.

Preferably, the front differential 18 further includes a housing 134 with a main body portion 135, two removable output cover plates 136A, 136B and a removable input cover plate 137. The housing 134 has a rear, input opening 138 extending through the input plate 137 and two side, output openings 139A, 139B each extending through one of the output plates 136A, 136B, the front axle axis 31 extending through the two output openings 139A, 139B. An input assembly 140 extends through the input opening 138 and includes a shaft 141 connectable with the second connective member 124 of the first propeller shaft 14 and a pinion gear 142. The pinion gear 142 is disposed within the housing 134 and is engageable with the gear member 30, such that the first propeller shaft 14 drives the gear member 30, and thus the front axle shafts 7A, 7B, through the pinion gear 142. Preferably, the gear member 30 is a ring gear 144 and is preferably integrally formed with a generally tubular clutch housing 146. The clutch housing 146 has a central bore 148 sized to receive the carrier 132 and a plurality of axially-extending contoured recesses 150 spaced circumferentially about the bore 148, each recess 150 providing a tapered cam surface 152, the purpose of which is discussed below. Further, each side member 130A, 130B is preferably formed as a generally circular-cylindrical bar 154 having an outer circumferential surface 155 and an axial opening 156 with a plurality of radially-inwardly extending axial splines 157. Each side member bar 154 extends through and is rotatably disposed within a separate one of the housing output openings 139A, 139B so as to be spaced apart along the front axle axis 31. Each side member 130A, 130B is connected with a separate one of the two front axle shafts 7A, 7B, respectively, by inserting a splined end 153 of each front axle shaft 7A, 7B within the axial opening 156 of the particular side member bar 154. Preferably, one of the two side member bars 154 has an axial peg 158 disposed within an axial opening 156 of the other bar 154 so as to maintain axial alignment of the two side members 130A, 130B during rotation of the front axle shafts 7A, 7B.

Figure 16A:
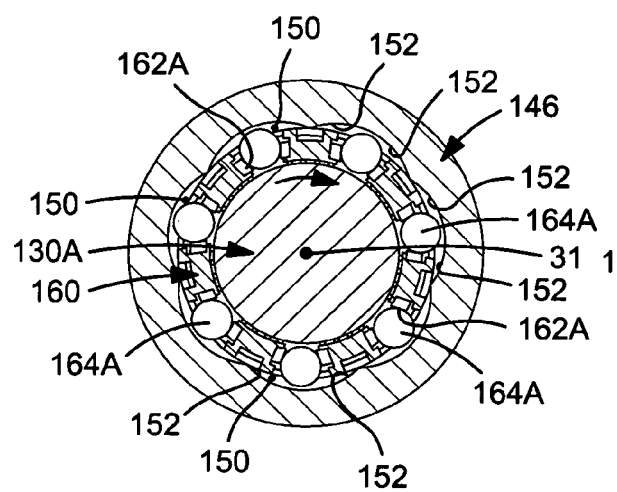
FIGS. 16A and 16B, collectively

Furthermore, the carrier 132 preferably includes a generally tubular roll cage 160 having a two axially spaced sets of slotted openings 162A, 162B, each set of openings 162A, 162B being spaced circumferentially about the roll cage 160. The carrier 132 further includes two axially spaced sets of roll pins 164A, 164B, one pin 164A, 164B of each set being disposed within each one of the cage openings 162A, 162B, respectively. Each set of pins 164A, 164B is engageable with the proximal side member 130A, 130B, respectively, so as to operatively connect the carrier 132 with the particular side member 130A, 130B. More specifically, each pin 164A, 164B is partially disposed within one of the housing contoured recesses 150 and is contactable with the outer circumferential surface 155 of the associated side member 130A or 130B. When the axle shafts 7A, 7B rotate at a greater speed than the gear member 30, the roll pins 164A, 164B all remain generally centered within the associated clutch housing contoured recesses 150, such that the side members 130A, 130B rotate within the cage 160 while slipping past the pins 164A, 164B, as shown in FIG. 16A. As such, the axle shafts 7A, 7B will not be driven by or receive torque from the front propeller shaft 14.

Figure 16B:
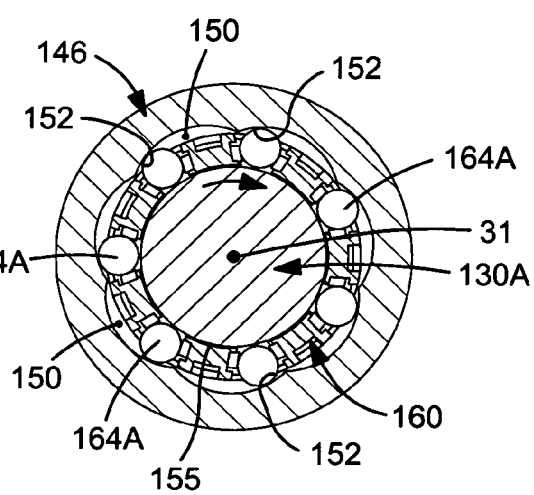

However, when the gear member 30 rotates at a greater speed than the axle shafts 7A, 7B, such as when both rear wheels 9C, 9D slip relative the base surface G, the clutch housing 146 displaces relative to the roll cage 160 until the roll pins 164A, 164B become wedged between the cam surface 152 and the outer surface 155 of the associated side member bar 154, thereby coupling the side members 130A, 130B and the axle shafts 7A, 7B with the gear member 30, as shown in FIG. 16B. As such, the transmission output shaft 13 drives the front shafts 7A, 7B through the front propeller shaft 14, the pinion gear 142, the ring gear 144, the carrier 132 and the side members 130A, 130B. In addition, even when the side members 130A, 130B are coupled with the carrier 132, and thereby with the ring gear 166, one of the side members 130A or 130B may disengage from the carrier 132 when the one front wheel 9A or 9B rotates faster than the other, such as when the vehicle 1 performs a turning movement. Specifically, when the "outer" wheel 9A or 9B rotates at a greater speed than the "inner" wheel 9B, 9A, the side member 130A, 130B connected with the outer axle will start to rotate at a greater speed than the roll cage 160, the clutch housing 146 and the ring gear 144, causing the roll pins 164A, 164B associated with the particular side member 130 to move toward the center of the housing contoured recesses 150, enabling the particular side member bar 154 to slip past the roll pins 164A, 164B.

Preferably, the front differential 18 is provided by a commercially available differential device, most preferably a modified "Centralized Front Drive Gearcase" from The Hilliard Corporation of Elmira, N.Y., as basically described in U.S. Pat. No. 6,629,590 which is incorporated by reference herein. However, the front differential 18 may alternatively be provided by any other appropriate differential device that enables the power train 10 of the present invention to function generally as described herein.

Referring to FIGS. 2, 3 and 17-20, the rear differential 20 basically includes, in addition to the gear member 32 discussed above, two side members 170A, 170B and a carrier 172. The two side members 170A, 170B are each connected with a separate one of the two rear axle shafts 8A, 8B and the carrier 172 is releasably connectable with the gear member 32, such that the second propeller shaft 16 rotatably drives the carrier 172. The carrier 172 is configured to engage with the gear member 32 when the carrier 172 rotates at about the same rotational speed as the gear member 32 and to disengage from the gear member 32 when the carrier 172 rotates at a greater speed than the gear member 32. Preferably, the carrier 172 is further configured to releasably connect with each one of the two side members 170A, 170B when the two rear wheels 9C, 9D roll at about the same speed and to alternatively disconnect from one of the two side members 170A or 170B when the rear wheel 9C, 9D connected with the side member 170A, 170B, respectively, rolls at a greater speed than the other rear wheel 9D, 9C. With this structure, when the carrier 172 is connected with the two side members 170A, 170B and is engaged with the gear member 32, each rear axle shaft 8A and 8B receives about half of the torque transmitted to the gear member 32 from the second propeller shaft 16. Further, when one of the two side members 170A or 170B is disconnected from the carrier 172 and the carrier 172 is engaged with the gear member 32, the axle shaft 8B, 8A connected with the other one of the two side members 170B, 170A receives generally all of the torque transmitted to the gear member 32 from the second propeller shaft 16.

Preferably, the rear differential 20 further includes housing 177 formed of upper and lower shell halves 178A, 178B and having a front, input opening 179 and two side, output openings 180A, 180B, the rear axle axis 33 extending through the openings 180A, 180B. An input assembly 169 extends through the input opening 179 and includes a shaft 174 connectable with the second connective member 124 of the second propeller shaft 16 and a pinion gear 176. The pinion gear 176 is disposed within the housing 177 and is engageable with the gear member 32, such that the second propeller shaft 16 drives the gear member 32, and thus the axle shafts 8A, 8B, through the pinion gear 176. Preferably, the gear member 32 is formed as a ring gear 178 having an inner contact face 178a and the rear differential 20 includes a carrier housing 180 connected with the gear 178 by a plurality of fasteners (not indicated). The carrier housing 180 bounds an interior chamber Cc and includes an annular portion 179 disposable against the ring gear 178 and U-shaped portion 181. The housing U-shaped portion 181 provides a retainer wall 182 and has an axial opening 181a extending through the wall 182 and two aligned radial openings 181b (one shown), as best shown in FIG. 18.

Figure 20:
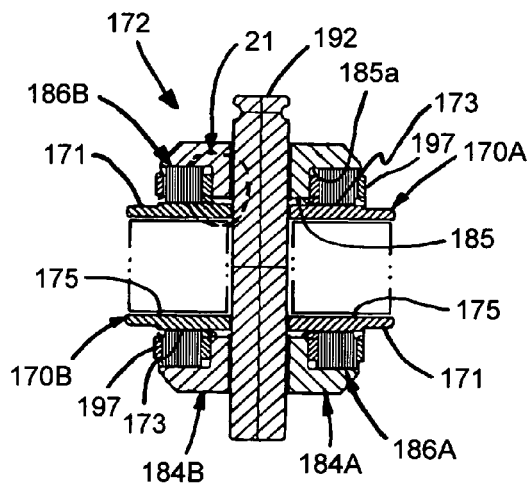
FIG. 20 is a greatly enlarged cross-sectional view of the rear differential carrier.

Referring particularly to FIG. 20, each side member 170A, 170B is preferably formed as a relatively short circular tube 171 sized to fit within the carrier 172, as described below, and having an outer circumferential surface 173 and an inner circumferential surface forming a central bore 175. Each side member tube 171 has a plurality of axial splines (not indicated) extending radially into the bore 175 and configured to engage with a splined end 167a of a separate one of the rear axle shafts 8A, 8B, so as to releasably couple the axle shafts 8A, 8B with the gear member 32. Further, each tube 171 further has a plurality of radially-outwardly extending axial splines (not indicated) formed in the outer surface 173 and configured to engage with one clutch pack 186A or 186B of the carrier 172, as described below, so as to couple the particular side member 170A or 170B with the carrier 172.

Figure 17:
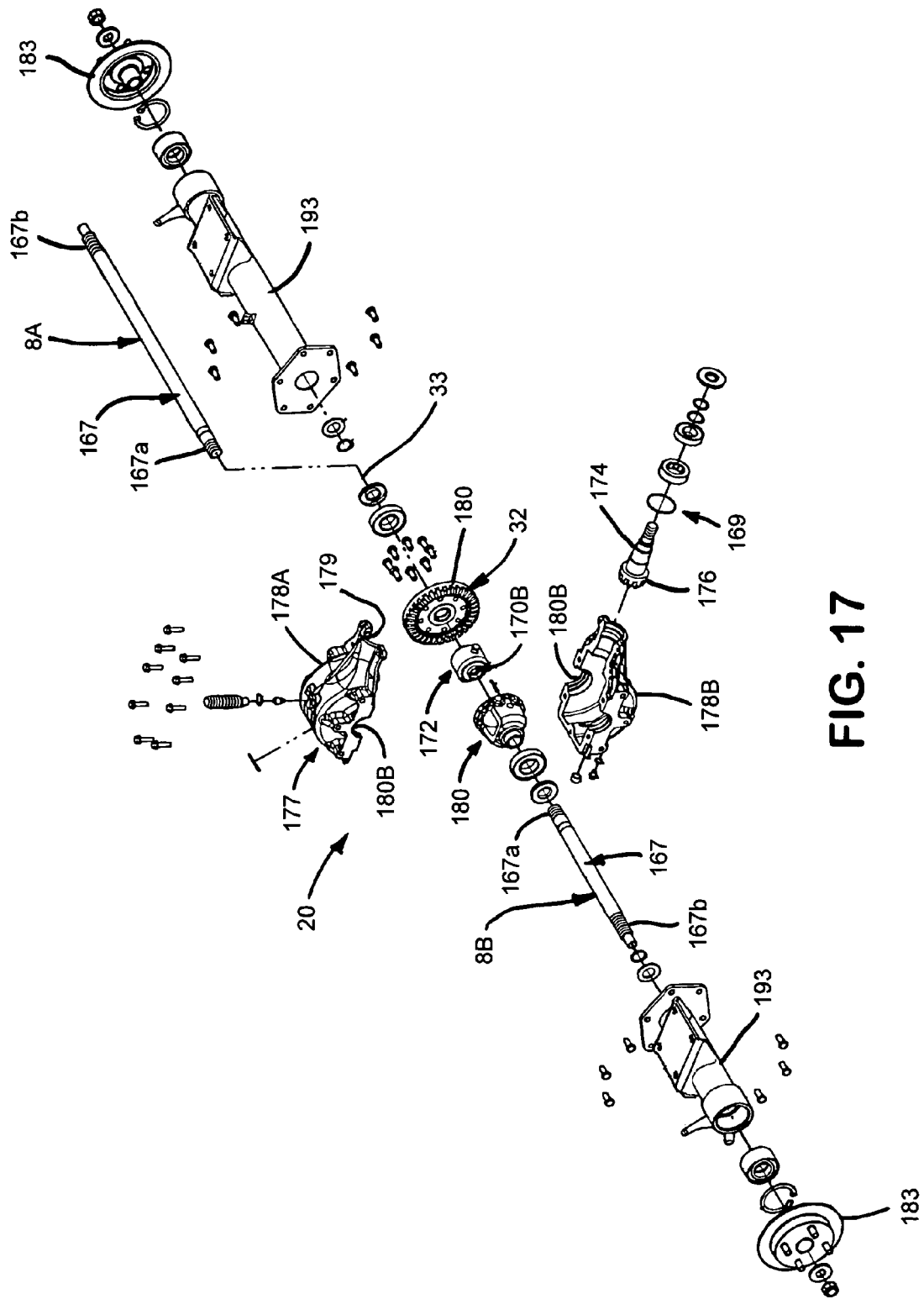
FIG. 17 is an exploded view of a rear differential of the power train.

Referring to FIGS. 17 and 20, each rear axle shaft 8A, 8B is preferably formed as a circular bar 167 having a first splined end 167a connected with the tube 171 of the associated side member 170A or 170B and an opposing splined end 167b connected with a hub 183 of the associated wheel 9A or 9B. Each axle shaft bar 167 is preferably rotatably disposed within a separate one of two tubular axle housings 193 fixedly attached to the vehicle frame 2 (see FIG. 2).

Figure 18:
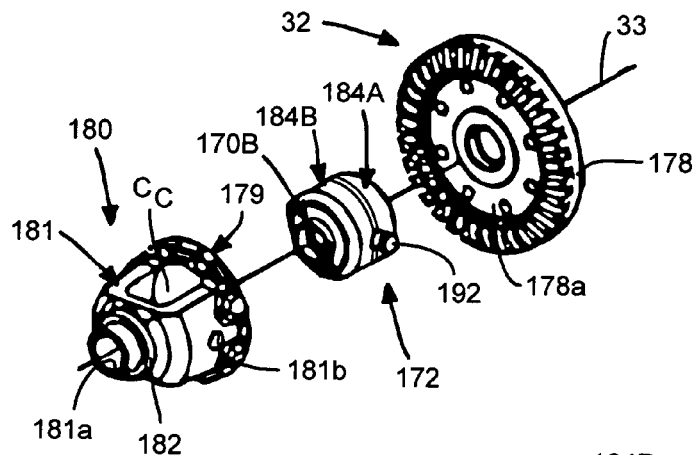
FIG. 18 is an enlarged, perspective view of a carrier, a carrier housing and a gear member of the rear differential.
Figure 19:
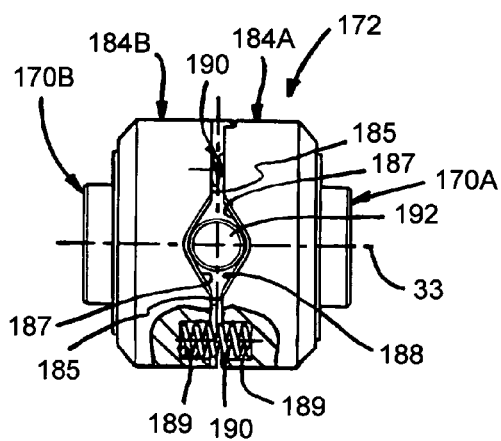
FIG. 19 is a greatly enlarged, partly broken-away side plan view of the rear differential carrier.

Referring now to FIGS. 18-20, the carrier 172 preferably includes two generally circular cylindrical blocks 184A, 184B, each block 184A, 184B having a central axial bore 185 with a counterbore section 185a, and two clutch packs 186A, 186B each disposed within the counterbore section 185a of a separate one of the blocks 184A, 184B, respectively, and configured to engage with a separate one of the side members 170A, 170B, respectively. Each block 184A, 184B has an inner radial face 185 with a pair of radially-extending, contoured recesses 187, the two block faces 185 being generally facing and contactable with each other such that the two pairs of recesses 187 form a coupler opening 188 extending radially through the carrier 172. Each carrier block 184A, 184B further has a plurality of axially extending, spring retainer openings 189 aligned with corresponding openings 189 in the other block 184B, 184A. The carrier 172 further includes a plurality of springs 190 each disposed within each pair of aligned openings 189 and are arranged to bias the two carrier blocks 184A, 184B generally away from each other and generally toward the housing retainer wall 182 and the ring gear contact face 178a, respectively, for reasons discussed below. The carrier 172 is driveably connected with the carrier housing 180 by means of a pin 192 extending through the two carrier housing coupler openings 182a and through the carrier coupler opening 188.

Figure 21:
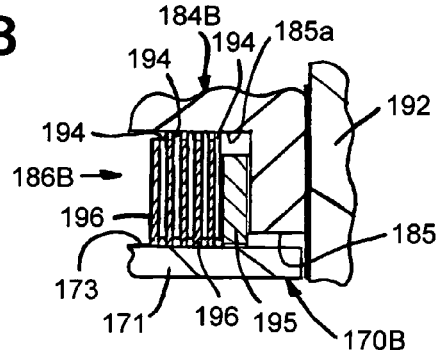
FIG. 21 is an even more greatly enlarged view of a broken-away portion of FIG. 20, as indicated by arrow 21.

Referring to FIGS. 20 and 21, each clutch pack 186A, 186B is configured to releasably couple a separate one of the side members 170A, 170B, respectively, to the associated carrier block 184A, 184B, respectively, thereby operatively connecting the ring gear 178 with the associated rear axle shaft 8A, 8B, respectively. Preferably, each clutch pack 186A, 186B includes a plurality of annular reaction plates 194 connected with the associated carrier block 184A, 184B and a plurality of annular friction plates 196 connected with the associated side member 170A, 170B, the plates 194, 196 being arranged in a staggered axial stack disposed between inner and outer retainer rings 195, 197. In other words, the plates 194, 196 are spaced alternating in each pack 186A, 186B such that at least a portion of each friction plate 196 is disposed between two of the reaction plates 194. Further, each annular plate 194, 196 of the two clutch packs 186A, 186B has a central opening (none indicated) sized such that the friction plates 196 fit about and are splined to the outer surface 173 of the associated side member tube 171 and the tube 171 extends through each reaction plate 194 with clearance. With the above-structure, when the springs 190 bias each block 184A, 184B against the housing retainer wall 182 and the gear contact face 178a, respectively, each friction plate 196 is "sandwiched" between two reaction plates 194 so as frictionally couple all the plates 194, 196 of each pack 186A, 186B and thereby operatively connect the side members 170A, 170B with the carrier 172 (and thus the ring gear 178), as discussed in further detail below.

Generally, the clutch packs 186A, 186B couple the side members 170A, 170B with the carrier 172 so that when the rear propeller shaft 16 drives the ring gear 178 through the pinion gear 176, the ring gear 178 rotatably drives the carrier housing 180, the carrier 172 and both side members 170A, 170B, such that the two rear axles shafts 8A, 8B rotate generally as a single unit about the rear axle shaft axis 33. However, when the vehicle 1 performs a turning movement, the "outer" axle shaft 8A or 8B will experience a net increase in torque as the outer wheel 9C or 9D attempts to rotate faster to negotiate the turn without slipping. Such increase in torque increases axial tension in the outer shaft subassembly (i.e., axle shaft 8A or 8B, side member 170A or 170B, and carrier block 184A or 184B), which compresses the springs 190 biasing the particular carrier block 184A or 184B against the carrier housing wall 182 or the gear contact face 178a, respectively. When the springs 190 are compressed, the friction plates 196 are free to rotate relative to the reaction plates 194, thereby permitting the particular side member 170A or 170B and connected axle shaft 8A, 8B to rotate at a greater speed than the carrier 172 (and thus the other, "inner" shaft 8B or 8A) until the turning movement has been completed. At that point, the springs 190 once again bias the particular carrier block 184A or 184B against the housing wall 182 or the gear face 187a and cause the friction plates 196 to become again sandwiched between (and frictionally engaged with) the reaction plates 194, such that the rear axle shaft 8A or 8B is again rotatably coupled with the carrier 172 and the ring gear 178 (and thus also the second propeller shaft 16).

Preferably, the carrier 172 and side members 170A, 170B are provided by a commercially available assembly, most preferably a "Detroit Gearless Locker" from Tractech Inc. of Warren, Mich. However, the carrier 172 and the side members 170A, 170B may be provided by any other appropriate device(s) that function generally as described herein.

The power train 10 of the present invention, as described in detail above, provides is clearly advantageous over previously known power trains of utility vehicles. Most importantly, the number of controls required to operate the utility vehicle 1 on any type of terrain without a loss of traction are substantially reduced. Specifically, a vehicle operator or "driver" generally operates the vehicle by operating a single shift lever, i.e., to actuate the shifter assembly 100 between the forward, reverse and neutral positions as discussed above, and will be able to drive the vehicle through a range of speeds extending between zero (0) mph and at least twenty-five (25) mph and on any type of terrain or traction conditions (i.e., "on-road" in dry, wet or snowy conditions, off-road on firm or muddy ground, etc).

It will be appreciated by those skilled in the art that changes could be made to the embodiments described above without departing from the broad inventive concept thereof. For example, the transmission 12 of the present invention may be incorporated into a vehicle 1 that does not include a front differential 18 and/or rear differential 20 as each described herein, the power train 10 may include a gearbox and/or transmission unit constructed in another appropriate manner, etc. It is understood, therefore, that this invention is not limited to the particular embodiments disclosed, but it is intended to cover modifications within the spirit and scope of the present invention as defined by the appended claims.

The invention claimed is:

1. A power train for a vehicle, the vehicle having a frame, an engine mounted to the frame and having a rotatable engine output shaft, and front and rear axles each rotatably connected with the frame, each axle including two axle shafts and two wheels, each wheel being connected with a separate one of the axle shafts and rollable upon a base surface, the power train comprising:

a transmission operably connected with the engine and having a transmission output shaft;

a first propeller shaft having a first end, the first end being connected with the transmission output shaft, and a second end;

a front differential connected with each one of the two front axle shafts and having a front differential gear member configured to rotatably drive the two front axle shafts, the front differential being operatively connected with the second end of the first propeller shaft such that the first propeller shaft drives the front differential gear member at a first speed reduction ratio;

a second propeller shaft having a first end, the first end being connected with the transmission output shaft, and a second end; and a rear differential connected with each one of the two rear axle shafts and having a rear differential gear member configured to rotatably drive the two rear axle shafts, the rear differential being operatively connected with the second end of the second propeller shaft such that the second propeller shaft drives the rear differential gear member at a second speed reduction ratio, the first speed reduction ratio being greater than the second speed reduction ratio such that the base surface drives the two front axle shafts to rotate independently of the front differential gear member when at least one of the two rear wheels rolls upon the base surface, the rear differential being configured to releasably connect each one of the two rear axle shafts with the other one of the two rear axle shafts when each of the two rear wheels rolls at about the same speed as the other one of the two rear wheels such that the two rear axle shafts rotate generally as a single unit and to alternatively disconnect at least one of the two rear axle shafts from the other one of the two rear axle shafts when one of the two rear wheels rolls at a greater speed than the other one of the two rear wheels during a turning movement of the vehicle.

2. The power train as recited in claim 1 wherein each one of the first and second propeller shafts is driven by the transmission output shaft so as to rotate at about the same speed.

3. The power train as recited in claim 1 wherein the rear differential includes:

two side members each connected with a separate one of the two rear axle shafts; and a carrier connected with the rear differential gear member such that second propeller shaft rotatably drives the carrier, the carrier being configured to releasably connect with each one of the two side members when the two rear wheels roll at about the same speed and to alternatively disconnect from one of the two side members when the one rear wheel connected with the one side member rolls at a greater speed than the other rear wheel.

4. The power train as recited in claim 3 wherein:

when the carrier is connected with the two side members, each rear axle shaft receives about half of the torque transmitted to the rear differential gear member from the second propeller shaft; and when one of the two side members is disconnected from the carrier, the rear axle shaft connected with the other one of the two carrier members receives generally all of the torque transmitted to the rear differential gear member from the second propeller shaft.

5. The power train as recited in claim 1 wherein the front differential is configured to:

releasably connect each one of the two front axle shafts with the front differential gear member when both of the rear wheels slip with respect to the base surface and to alternatively disconnect the two front axle shafts from the front differential gear member when at least one rear wheel rolls upon the base surface; and releasably connect each one of the two front axle shafts with the other one of the two front axle shafts when each of the two front wheels rolls at about the same speed as the other one of the two front wheels such that the two front axle shafts rotate generally as a single unit and alternatively disconnect at least one of the two front axle shafts from the other one of the two front axle shafts when one of the two front wheels rolls at a greater speed than the other one of the two front wheels during the turning movement of the vehicle.

6. The power train as recited in claim 5 wherein the front differential includes:

two side members each connected with a separate one of the two front axle shafts; and a carrier releasably connectable with the front differential gear member such that the first propeller shaft rotatably drives the carrier, the carrier being configured to engage with the front differential gear member when the carrier rotates at about the same rotational speed as the front differential gear member and to disengage from the front differential gear member when the carrier rotates at a greater speed than the front differential gear member, the carrier being further configured to releasably connect with each one of the two side members when the two front wheels roll at about the same speed and to alternatively disconnect from one of the two side members when the one front wheel connected with the one side member rolls at a greater speed than the other front wheel.

7. The power train as recited in claim 6 wherein:

when the carrier is connected with the two side members and engaged with the front differential gear member, each front axle shaft receives about half of the torque transmitted to the front differential gear member from the first propeller shaft; and when one of the two side members is disconnected from the carrier and the carrier is engaged with the front differential gear member, the front axle shaft connected with the other one of the two side members receives generally all of the torque transmitted to the front differential gear member from the first propeller shaft.

8. The power train as recited in claim 1 wherein the transmission further includes:

a gearbox including the transmission output shaft and a rotatable gearbox input shaft operatively coupleable with the transmission output shaft; and a continuously variable transmission unit connected with the engine output shaft and with the gearbox input shaft such that the engine output shaft drives the gearbox input shaft.

9. The power train as recited in claim 8 wherein:

the gearbox is configured such that the gearbox input shaft drives the transmission output shaft at a single, fixed speed ratio in a first rotational direction and alternatively drives the transmission output shaft at a single, fixed speed ratio in a second, opposing rotational direction;

the continuously variable transmission unit is configured so that a ratio of a rotational speed of the engine output shaft to a rotational speed of the gearbox input shaft is variable within a range of values having a lower limit of less than 1 and an upper limit of greater than 3.

10. A power train for a vehicle, the vehicle having a frame, an engine mounted to the frame and having a rotatable engine output shaft, and front and rear axles each rotatably connected with the frame, each axle including two axle shafts and two wheels, each wheel being connected with a separate one of the axle shafts and rollable upon a base surface, the power train comprising:

a transmission operably connected with the engine and having a transmission output shaft;

a first propeller shaft having a first end and a second end, the first end being connected with the transmission output shaft such that the transmission output shaft rotatably drives the first propeller shaft;

a front differential connected with each one of the two front axle shafts and having a front differential gear member configured to rotatably drive the two front axle shafts, the front differential being operatively connected with the second end of the first propeller shaft such that the first propeller shaft drives the front differential gear member at a first speed reduction ratio;

a second propeller shaft having a first end and a second end, the first end being connected with the transmission output shaft such that the transmission output shaft rotatably drives the second propeller shaft so that each one the first and second propeller shafts rotates at about a same speed as the other one of the first and second propeller shafts; and a rear differential connected with each one of the two rear axle shafts and having a rear differential gear member configured to rotatably drive the two rear axle shafts, the rear differential being operatively connected with the second end of the second propeller shaft such that the second propeller shaft drives the rear differential gear member at a second speed reduction ratio, the first speed reduction ratio being greater than the second speed reduction ratio such that the base surface drives the two front axle shafts to rotate independently of the front differential gear member when at least one of the two rear wheels rolls upon the base surface.

11. A utility vehicle comprising:

a frame;

an engine mounted to the frame and having a rotatable engine output shaft;

front and rear axles each rotatably connected with the frame, each axle including two axle shafts and two wheels, each wheel being connected with a separate one of the axle shafts and rollable upon a base surface;

a transmission operably connected with the engine and having a transmission output shaft;

a first propeller shaft having a first end, the first end being connected with the transmission output shaft, and a second end;

a front differential connected with each one of the two front axle shafts and having a front differential gear member configured to rotatably drive the two front axle shafts, the first differential being operatively connected with the second end of the first propeller shaft such that the first propeller shaft drives the front differential gear member at a first speed reduction ratio;

a second propeller shaft having a first end, the first end being connected with the transmission output shaft, and a second end; and a rear differential connected with each one of the two rear axle shafts and having a rear differential gear member configured to rotatably drive the two rear axle shafts, the rear differential being operatively connected with the second end of the second propeller shaft such that the second propeller shaft drives the rear differential gear member at a second speed reduction ratio, the first speed reduction ratio being greater than the second speed reduction ratio such that the base surface drives the two front axle shafts to rotate independently of the front differential gear member when at least one of the two rear wheels rolls upon the base surface.

* * * * *